US008491379B2

(12) United States Patent
Uchiyama et al.

(10) Patent No.: US 8,491,379 B2
(45) Date of Patent: Jul. 23, 2013

(54) GAME SYSTEM INCLUDING DRAWING MACHINE FOR JACKPOT GAME

(75) Inventors: Takashi Uchiyama, Kanagawa (JP); Kazuhiro Kusuda, Kanagawa (JP); Nobuhiro Goto, Kanagawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 313 days.

(21) Appl. No.: 12/865,435

(22) PCT Filed: Feb. 2, 2009

(86) PCT No.: PCT/JP2009/051703

§ 371 (c)(1),
(2), (4) Date: Jul. 30, 2010

(87) PCT Pub. No.: WO2009/099028

PCT Pub. Date: Aug. 13, 2009

(65) Prior Publication Data

US 2011/0003635 A1 Jan. 6, 2011

(30) Foreign Application Priority Data

Feb. 4, 2008 (JP) ................................ 2008-023461

(51) Int. Cl.
*A63F 13/12* (2006.01)
*A63F 9/24* (2006.01)

(52) U.S. Cl.
USPC .................. 463/25; 463/26; 463/27; 463/28; 463/42

(58) Field of Classification Search
USPC .............................. 463/16, 21, 25–28, 40–43
See application file for complete search history.

(56) References Cited

U.S. PATENT DOCUMENTS

2007/0060280 A1 3/2007 Okada

FOREIGN PATENT DOCUMENTS

WO WO 2007/026404 A1 3/2007

OTHER PUBLICATIONS

International Search Report for PCT Application No. PCT/JP2009/051703 dated Apr. 21, 2009, pp. 1-3.
Japanese Office Action for JP Application No. 2008-023461 dated Apr. 17, 2009, pp. 1-4.
Taiwanese Office Action for TW Application No. 098103443 dated Feb. 4, 2012, pp. 1-3.
Taiwanese Search Report for TW Application No. 098103443 dated Feb. 4, 2012, pp. 1-3.
Written Opinion for PCT Application No. PCT/JP2009/051703 dated Apr. 21, 2009, pp. 1-3.

*Primary Examiner* — Damon Pierce

(57) ABSTRACT

A pool amount (payout amount) of a jackpot award is adjusted without deteriorating individual game attractiveness of all game apparatuses even in a game system in which game apparatuses of different models are mixed.
Each game progress control unit of a plurality of game apparatuses controls the progress of a game in such a manner that a ratio of an amount of payout objects paid out to a player by a payout process of the payout processing unit to an amount of bet objects received by the bet object receiving unit within a predetermined period comes closer to a normal preset payout ratio obtained by deducting a player's own pool ratio indicated by the pool ratio data stored in the pool ratio storage unit of the game apparatus concerned from a total preset payout ratio indicated by the preset payout ratio data stored in the preset payout ratio storage unit of the game apparatus concerned. These game apparatuses are provided with a pool ratio changing unit for changing the pool ratio data stored in a player's own pool ratio storage unit independent from each other.

11 Claims, 18 Drawing Sheets

FIG. 17
WIDE AREA
PROGRESSIVE
JACKPOT CHANCE

GAME SYSTEM INCLUDING DRAWING MACHINE FOR JACKPOT GAME

TECHNICAL FIELD

The present invention relates to a game system which includes a drawing machine for jackpot game for performing a jackpot drawing to determine a jackpot award winner among players who play a plurality of game apparatuses.

BACKGROUND ART

Conventionally, this type of drawing machine for jackpot game includes, for example, that utilized in a game system configured with a plurality of token-operated game machines (game apparatuses) installed in a game center and others (for example, refer to Patent Document 1). In general, a token-operated game machine controls game progress on the condition where tokens are received (bet objects) from a player and pays out to the player a predetermined number of tokens (payout objects) according to the game result thereof. An explanation will be given for an example of a token-operated game machine which utilizes a drawing machine for jackpot game, that is, the number of tokens obtained by multiplying the number of tokens (bet objects) received from a player by a predetermined pool ratio is added accumulatively and retained as payout amount data in a storage unit of the drawing machine for jackpot game. Then, when a predetermined drawing start condition is satisfied, the drawing machine for jackpot game is used to perform a drawing, thereby determining whether a jackpot award is won or a game is lost (loss). In this drawing, when the jackpot award is won, a process is performed for paying out the number of tokens corresponding to at least a part of the amount of the payout amount data to a player who has satisfied the predetermined drawing start condition and also decreasing the payout amount data to a predetermined value.

In general, a drawing machine for jackpot game is mainly utilized in a game system configured with a plurality of token-operated game machines, each of which is provided with a game progress control unit for controlling game progress independent from each other. This is due to the following reasons.

The number of tokens that a player can obtain in each token-operated game machine is limited to some extent due to the relationship with a total preset payout ratio which has been set in advance in individual token-operated game machines. More specifically, the total preset payout ratio is a target value which is a ratio of the number of tokens paid out by the token-operated game machine concerned (token payout count) to the number of tokens received by the token-operated game machine (token received count). Then, the game progress control unit of the token-operated game machine controls game progress in a manner that a ratio of the number of tokens actually paid out to the number of tokens actually received (total actual payout ratio) comes closer to the total preset payout ratio. Thereby, a player obtains tokens easily where the total preset payout ratio is high, while it becomes difficult for the player to obtain tokens where the total preset payout ratio is low. Then, the token payout count paid out to the player is roughly classified into a token payout count paid out by winning a jackpot award in a jackpot drawing and a token payout count paid out in an original game of the token-operated game machine (a game other than a jackpot drawing and hereinafter referred to as a "normal game"). That is, the total preset payout ratio is a sum of a ratio of the former token payout count to the token received count and a ratio of the latter token payout count to the token received count (hereinafter referred to as a "normal preset payout ratio"). The former ratio is equal to the above-described pool ratio. Therefore, the total preset payout ratio is a sum of the pool ratio and the normal preset payout ratio.

In this instance, in order that a player is able to expect to obtain many tokens by winning a jackpot award and kept interested in a jackpot drawing, it is desirable to increase a token payout count at the time of winning the jackpot award. A pool ratio will be increased if the token payout count is desired to be increased at the time of winning the jackpot award. However, a simple increase in the pool ratio alone will result in an increase in the total preset payout ratio. Then, the player can obtain many tokens, and a gaming facility (a gaming arcade) is unable to secure a profit. Therefore, in most cases, where a token payout count is increased in a jackpot award, a preset payout ratio is decreased only by an increased portion of a pool ratio so as not to cause any change in the total preset payout ratio. However, in this instance, it becomes difficult for the player to obtain tokens in a normal game with the token-operated game machine concerned only by a decreased portion of the normal preset payout ratio. For this reason, an excessively increased pool ratio may deteriorate the game balance of the normal game. Therefore, a change in the pool ratio is allowed only in a range that will not deteriorate the game balance of the normal game.

Where a drawing machine for jackpot game is utilized in a single token-operated game machine, as described above, it is impossible to increase a pool ratio significantly in view of the relationship with the game balance of the token-operated game machine concerned. Therefore, no significant increase in the pool count (that is, a token payout count at the time of winning a jackpot award) is allowed. It is, thus, difficult to raise a player's interest in a jackpot drawing by increasing a token payout count of a jackpot award.

On the other hand, where a drawing machine for jackpot game is utilized in a game system configured with a plurality of token-operated game machines, it is impossible to significantly increase a pool ratio in individual token-operated game machines due to the above-described reason. However, the number of token-operated game machines configuring the game system is increased, thereby making it possible to increase a total pool count obtained by summing up pool counts of individual token-operated game machines. Then, as compared with a single token-operated game machine, it is possible to increase the token payout count of a jackpot award.

Therefore, a drawing machine for jackpot game is more frequently utilized in a game system configured with a plurality of token-operated game machines than being used in a single token-operated game machine.

[Patent Document 1] Japanese Published Unexamined Patent Application No. 2002-253842

DISCLOSURE OF THE INVENTION

Problems to be Solved by the Invention

However, in a conventional game system which is configured with a plurality of token-operated game machines and utilizes a drawing machine for jackpot game, pool ratios of individual token-operated game machines are all set to be equal in value. This is due to the fact that a plurality of token-operated game machines configuring a conventional game system are mostly of the same models and same in game content with each other. In recent years, various types of game systems, for example, a game system in which a drawing machine for jackpot game is utilized and token-operated game machines of different models different in game content from each other are mixed, have been proposed. In this game system, if pool ratios of individual token-operated game machines are all set to be equal in value, the following problem will take place.

For example, such a case where it is preferable that players can obtain many tokens in a normal game or where it is preferable that players can obtain many tokens in a jackpot drawing due to a management policy or others of a gaming arcade is anticipated. Thus, it is desirable that a token-operated game machine is flexibly changed in pool ratio when the ratio is set according to the management policy or others of the gaming arcade.

It has been empirically demonstrated that, depending on the game content of token-operated game machines, the change in the pool ratio largely influences the game balance of a normal game in some of the token-operated game machines, while hardly influencing the game balance in others. Generally, in a token-operated game machine having a game content where a player mainly aims at obtaining many tokens, a significant change in the pool ratio will rarely give a large influence to the game balance of the normal game. On the other hand, in a token-operated game machine having a game content where the player mainly aims at enjoying playing a normal game, a significant change in the pool ratio will often give a large influence to the game balance of the normal game. Therefore, an extent that can change a pool ratio in a range that will not substantially influence the game balance of a normal game varies depending on the game content of individual token-operated game machines.

Therefore, in an attempt to change a pool ratio of each token-operated game machine in a game system in which token-operated game machines of different models different in game content from each other are mixed, a configuration in which the pool ratios of individual token-operated game machines are all set to be equal in value, as with a conventional game system, will largely influence the game balance of a normal game in some of the token-operated game machines. Thus, a problem arises that game attractiveness of the token-operated game machine concerned is greatly reduced.

The above-described problem is also found in a game system configured with pachinko machines and slot machines installed at a pachinko parlor and others in addition to a game system installed at a gaming arcade and others, where a drawing machine for jackpot game is utilized in a game system in which game apparatuses of different models different in game content from each other are mixed.

The present invention realizes and provides a game system capable of adjusting a pool amount (payout amount) of a jackpot award without deteriorating individual game attractiveness in all game apparatuses even in a game system in which game apparatuses of different models are mixed.

Means for Solving the Problem

As an aspect of the present invention, it is listed that a game system in which a plurality of game apparatuses and a drawing machine for jackpot game are connected to each other, so as to permit data communication, wherein a game progress control unit of each of the plurality of game apparatuses controls progress of a game different in content from each other, wherein each of the plurality of game apparatuses includes: a game progress control unit for controlling the progress of a game, a bet object receiving unit for receiving bet objects, a payout processing unit which performs a payout process for paying out to a player a predetermined amount of payout objects based on a result of the game whose progress is controlled by the game progress control unit on condition that the bet object receiving unit receives the bet objects, a pool ratio storage unit for storing pool ratio data indicating a game apparatus's own pool ratio, and a preset payout ratio storage unit for storing a preset payout ratio data indicating a game apparatus's own total preset payout ratio: the drawing machine for jackpot game includes; a drawing unit which performs a jackpot drawing for determining a winning player of a jackpot award among players who play the respective plurality of game apparatuses, a payout amount storage unit for storing payout amount data including an amount of payout objects to be paid out to the winning player when the drawing unit makes determination of winning of the jackpot award, a jackpot payout processing unit which performs a jackpot payout process for reading out the payout amount data from the payout amount storage unit upon the determination of the winning of the jackpot award by the drawing unit and paying out to the winning player at least a part of payout objects corresponding to an amount indicated by the read-out payout amount data, and a payout amount increasing unit for increasing cumulatively an amount indicated by the payout amount data stored in the payout amount storage unit, according to each pool amount obtained by multiplying the pool ratio of each game apparatus by an amount of bet objects received by each bet object receiving unit of the plurality of game apparatuses when a predetermined payout amount increasing condition is satisfied: each game progress control unit of the plurality of game apparatuses controls the progress of the game in such a manner that a ratio of an amount of payout objects paid out to players by the payout process of the payout processing unit to an amount of bet objects received by the bet object receiving unit within a predetermined period comes closer to a normal preset payout ratio obtained by deducting a pool ratio indicated by the pool ratio data stored in the pool ratio storage unit of the game apparatus from a total preset payout ratio indicated by the preset payout ratio data stored in the preset payout ratio storage unit of the game apparatus: and each of the plurality of game apparatuses includes a pool ratio changing unit for changing the pool ratio data stored in the game apparatus's own pool ratio storage unit independently from each other.

In this game system, it is possible to change independently the pool ratio data of individual game apparatuses for controlling the progress of games different in content from each other independently of other game apparatuses. Therefore, it is possible to change individually a pool ratio of each game apparatus in a range that will not substantially influence the game balance of a normal game (a game other than a jackpot drawing) in each game apparatus.

Further, in a conventional game system which is configured so as to set all pool ratios of individual game apparatuses to be equal in value, it is difficult to incorporate a game apparatus, which largely influences the game balance of a normal game when the pool ratio changes significantly, into a game system. This is because if an attempt is made to change a pool ratio in the above-described game system in a range that will not substantially influence the game balance of a normal game in each game apparatus, an extent of change in the pool ratio at each game apparatus is largely limited by the presence of the game apparatus concerned. Thereby, it is impossible to increase or decrease a pool amount (payout amount data) greatly. However, according to the present invention, it is possible to change individually a pool ratio of each game apparatus. Thus, even where a game apparatus that a significant change in the pool ratio gives a large influence to the game balance of a normal game is mixed, the pool ratio of the other game apparatus can be changed without being limited by the presence of the game apparatus concerned. Therefore, the pool ratio of the above-described other game apparatus is changed greatly, thus making it possible to increase or decrease a pool amount (payout amount data) to a greater extent.

In the above-described game system, at least one game apparatus among the plurality of game apparatuses may include a preset payout ratio changing unit for changing the preset payout ratio data stored in the game apparatus's own preset payout ratio storage unit.

Where the preset payout ratio is constant, a higher pool ratio will decrease a normal preset payout ratio. In contrast, a lower pool ratio will increase the normal preset payout ratio. However, a case where it is preferable to change a pool ratio, with the normal preset payout ratio kept in a certain game apparatus or, on the other hand, it is preferable to change the normal preset payout ratio, with the pool ratio kept, according to a management policy or others of a gaming arcade, is assumed. According to the present game system, not only the pool ratio but also the preset payout ratio can be changed at least in the above-described one game apparatus. Thus, it is possible to respond to the management policy or others of the gaming arcade.

In addition, the above-described game system may further include a single changing operation receiving unit for receiving a changing operation of pool ratio data in two or more game apparatuses, wherein each pool ratio changing unit of the two or more game apparatuses may change pool ratio data stored in the pool ratio storage unit of the game apparatus to pool ratio data related to the changing operation received by the changing operation receiving unit when the changing operation receiving unit receives the changing operation of pool ratio data in the game apparatus concerned.

In a configuration in which each of the game apparatuses receives individually changing operation of pool ratio data in each game apparatus, in order to change pool ratio data in a plurality of game apparatuses, an operator is required to perform the changing operation of the pool ratio data by walking over to various locations of game apparatuses to be changed. Thereby, the changing operation of the pool ratio data is complicated in each game apparatus.

In the present game system, a single changing operation receiving unit can be used to change the pool ratio data in two or more game apparatuses. Therefore, where the pool ratio data is changed in the two or more game apparatuses, the operator may go to the installation location of the changing operation receiving unit concerned and change the pool ratio data. Thus, the operator is not required to walk over to various locations of game apparatuses to be changed and able to change easily the pool ratio data in each of the game apparatuses.

In the above-described game system, the drawing machine for jackpot game may include; a pool amount storage unit for storing pool amount data indicating pool amounts of the plurality of game apparatuses within a predetermined period for every game apparatus, and a winning probability changing unit for changing a winning probability of the jackpot award in each player who plays the plurality of game apparatuses according to a pool amount indicated by pool amount data corresponding to the game apparatus played by the player concerned.

In this game system, a winning probability of jackpot award for each player who plays at a plurality of game apparatuses changes according to a pool amount within a predetermined period in a game apparatus at which the player plays. In this instance, the predetermined period can be set in an appropriate manner. For example, the period can be set to be a period from a point in time at which a previous jackpot award was won to a point in time at which a jackpot drawing is performed this time.

A jackpot award may be won in an increasing probability with an increase in the pool amount. On the other hand, the jackpot award may be won in a decreasing probability with an increase in the pool amount. In the former case, a game apparatus which makes a greater contribution to an increase in the payout amount of the jackpot award pays out the jackpot award more frequently. Therefore, it is advantageous that a total actual payout ratio is more easily brought closer to a total preset payout ratio in individual game apparatuses configuring the present game system. On the other hand, a greater contribution to an increase in the payout amount of the jackpot award is proportional to higher popularity of the game apparatus concerned. Thereby, in the former case, the jackpot award can be won more easily in a game apparatus higher in popularity, and the game apparatus higher in popularity will gain more popularity. However, it becomes difficult to win the jackpot award in a game apparatus lower in popularity, and the game apparatus will further lose popularity. In the latter case, that is, where the jackpot award is won in a decreasing probability with an increase in the pool amount, the jackpot award can be won more easily in a game apparatus lower in popularity. Therefore, in this instance, it is possible to regain popularity of the game apparatus lower in popularity.

In the above-described game system, four or more of the game apparatuses may be provided, the drawing unit of the drawing machine for jackpot game may perform a group drawing for selecting one winning group among a plurality of predetermined groups, each of which includes two or more game apparatuses, according to a predetermined group drawing condition, and where the winning group is selected by the group drawing, a winner drawing may be performed for selecting a jackpot award winning player among players who play respective two or more game apparatuses belonging to the winning group, thereby performing the jackpot drawing, and the drawing machine for jackpot game may include: a pool amount storage unit which stores for every group total pool amount data indicating a total pool amount obtained by summing up pool amounts of two or more game apparatuses belonging to each group within a predetermined period, and a winning probability changing unit for changing a winning probability of the group drawing in each group in such a manner that a group greater in total pool amount indicated by the total pool amount data corresponding to the group concerned is made higher in winning probability.

In this game system, the group drawing condition at the time of the group drawing is set in an appropriate manner, thus making it possible to manage the result of the group drawing so that winning groups do not concentrate on certain groups but disperse into various groups. Thereby, according to the present game system, it is possible to avoid a situation where winners concentrate on game apparatuses belonging to the same group. For example, where it is preferable that winners of a jackpot award do not concentrate on game apparatuses installed in the same gaming arcade, three or more game apparatuses configuring the present game system are divided into groups for each gaming arcade. Further, for example, where it is preferable that winners of a jackpot award do not concentrate on game apparatuses of the same model, three or more game apparatuses configuring the present game system are divided into groups for each model. Therefore, three or more game apparatuses configuring the present game system are divided into groups in an appropriate manner, concretely, game apparatuses are divided into groups in advance so that game apparatuses on which winners of a jackpot award preferably do not concentrate can belong to the same group, thus making it possible to prevent such a situation where winners of a jackpot award concentrate on the above-described game apparatuses.

Further, since a winning probability at the time of the group drawing is higher in a group having a greater pool amount, a game apparatus belonging to a group which makes a greater contribution to an increase in the payout amount of a jackpot award pays out a jackpot award more frequently. Therefore, an average value of total actual payout ratios of two or more game apparatuses belonging to each group can be easily brought closer to a total preset payout ratio of game apparatuses belonging to the group concerned.

In the above-described game system, the game apparatus may be a game apparatus for business use installed in a gaming arcade, and the plurality of predetermined groups may be divided into groups for each gaming arcade in which each game apparatus is installed.

In this game system, it is possible to prevent a situation where only players who play game apparatuses installed in a certain gaming arcade win a jackpot award.

Further, an average value of total actual payout ratios of two or more game apparatuses installed in each gaming arcade can be easily brought closer to a total preset payout ratio of game apparatuses belonging to the gaming arcade concerned. Thereby, each gaming arcade is able to manage a payout ratio easily.

In the above-described game system, the drawing machine for jackpot game may include a gaming arcade server of each gaming arcade connected in a manner to enable communication with two or more game apparatuses installed in the same gaming arcade, and a management server connected in a manner to enable communication with each of the gaming arcade servers, the group drawing may be performed by a drawing unit installed in the management server, and the winner drawing may be performed by a drawing unit installed in the gaming arcade server of the gaming arcade related to a winning group selected by the group drawing.

In this game system, since the winner drawing at the time of the jackpot drawing is performed by the gaming arcade server of each gaming arcade, it is possible to distribute some of the jackpot drawing process. Thereby, where a large scale game system configured with many game apparatuses is built, a drawback can be avoided that concentrated processing of jackpot drawings results in deterioration of a performance of an overall system or others.

Further, the winner drawing is performed by the gaming arcade server. Therefore, setting of the gaming arcade server can be changed in an appropriate manner in accordance with the management policy of a gaming arcade, thus making it possible to control which player is to win a game or how easily a player wins a game.

Effect of the Invention

According to the present invention, it is possible to adjust a pool amount (payout amount) of a jackpot award without deteriorating individual game attractiveness in all game apparatuses even in a game system in which game apparatuses of different models different in game content from each other are mixed.

DESCRIPTION OF REFERENCE NUMERALS

1000 Horse-racing game machine (token-operated game machine)
1010 Station
1101 Main control device
1108, 2625, 3107, 4003, 5003 External communication device
1201 Station control device
2000 Pusher game machine (token-operated game machine)
2601, 2611, 2621 Control device
3000 Slot machine (token-operated game machine)
3101 Control device
4000 Management server
4001 Control device
4002 Storage device
5000 Gaming arcade terminal unit
5001 Control device
5002 Storage unit
5005 Display unit
5006 Touch panel

BEST MODE FOR CARRYING OUT THE INVENTION

The following description will explain one embodiment applied to a game system configured with three types of token-operated game machines as arcade game machines (business-use game apparatuses) having game contents different from each other, and a gaming arcade terminal unit as a gaming arcade server and a management server that are jackpot drawing apparatuses connected to and capable of communicating with these token-operated game machines. It is noted that the gaming arcade server functions as a participation processing apparatus.

[System Overview]

First, the configuration of a whole game system according to the present embodiment will be explained.

Figure 1:
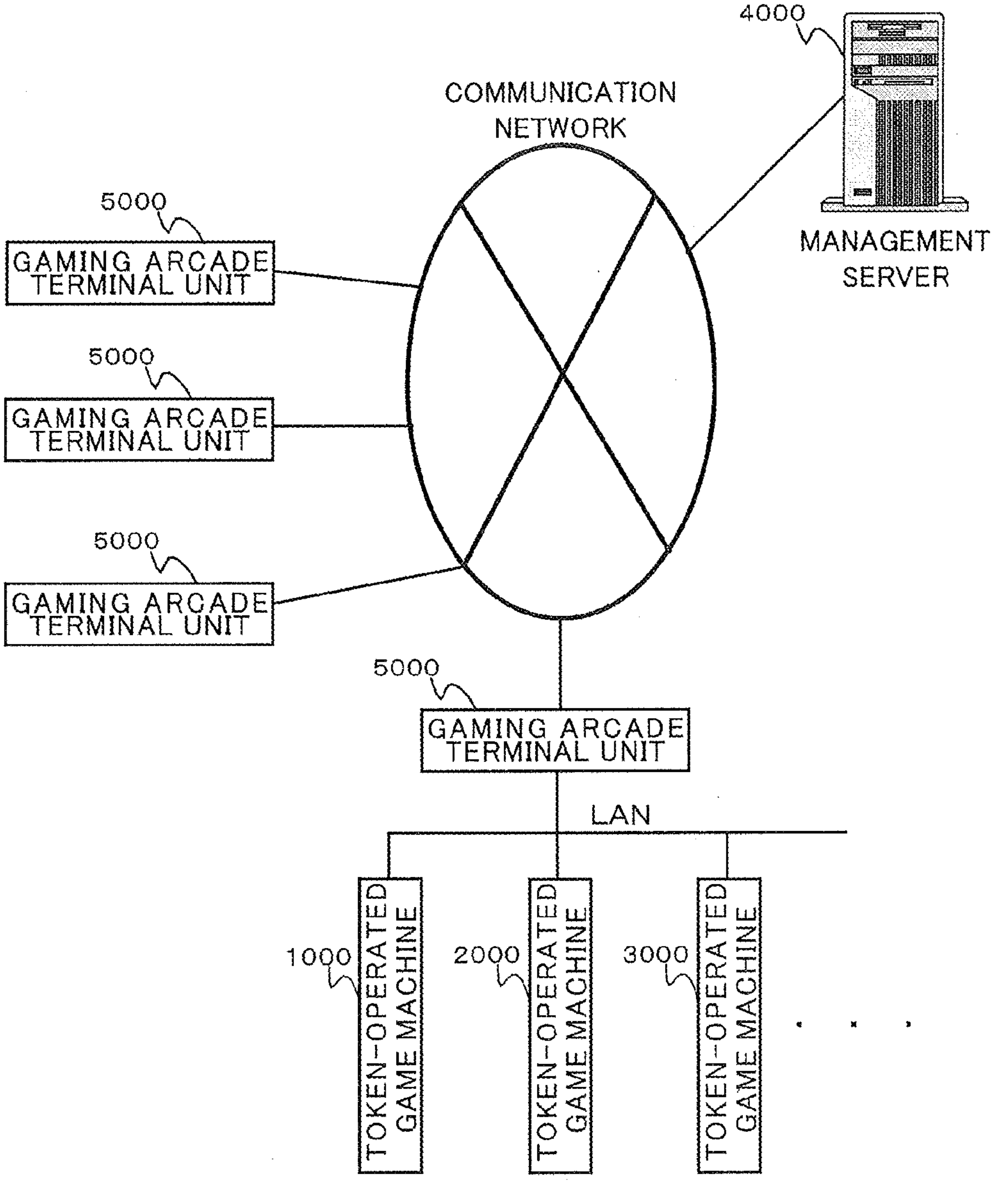
FIG. 1 is a schematic configuration diagram of a whole game system according to an embodiment.

FIG. 1 is a schematic configuration diagram of the whole game system according to the present embodiment.

Three types of token-operated game machines 1000, 2000, and 3000 constituting the game system are different types of game machines having hardware configurations different from each other. In the present embodiment, the token-operated game machines 1000, 2000, and 3000 are installed in a game facility such as a game center, etc., and connected to a gaming arcade terminal unit 5000 in the gaming arcade via a LAN (Local Area Network) that is a high-speed communication network. A management server 4000 is connected to the gaming arcade terminal unit in each gaming arcade, via a WAN (Wide Area Network) that is a low-speed communication network. The management server 4000 performs data communication with the gaming arcade terminal unit that performs system management for the whole gaming arcade by performing data communication with each of the token-operated game machines 1000, 2000, and 3000 so as to manage the whole game system. It is noted that a game system covering a plurality of gaming arcades will be explained in the present embodiment; the explanation, however, will be applied also to a game system within a single gaming arcade.

Next, the configuration and the operation of each of the token-operated game machines 1000, 2000, and 3000 will be explained.

[Horse-Racing Game Machine 1000]

The token-operated game machine 1000 is a horse-racing game machine.

In the horse-racing game machine 1000, one or at least two players predict an order of arrival for a horse race played in the horse-racing game machine, and when the prediction is correct, the player is capable of receiving a token payout according to odds against that order.

Figure 2:
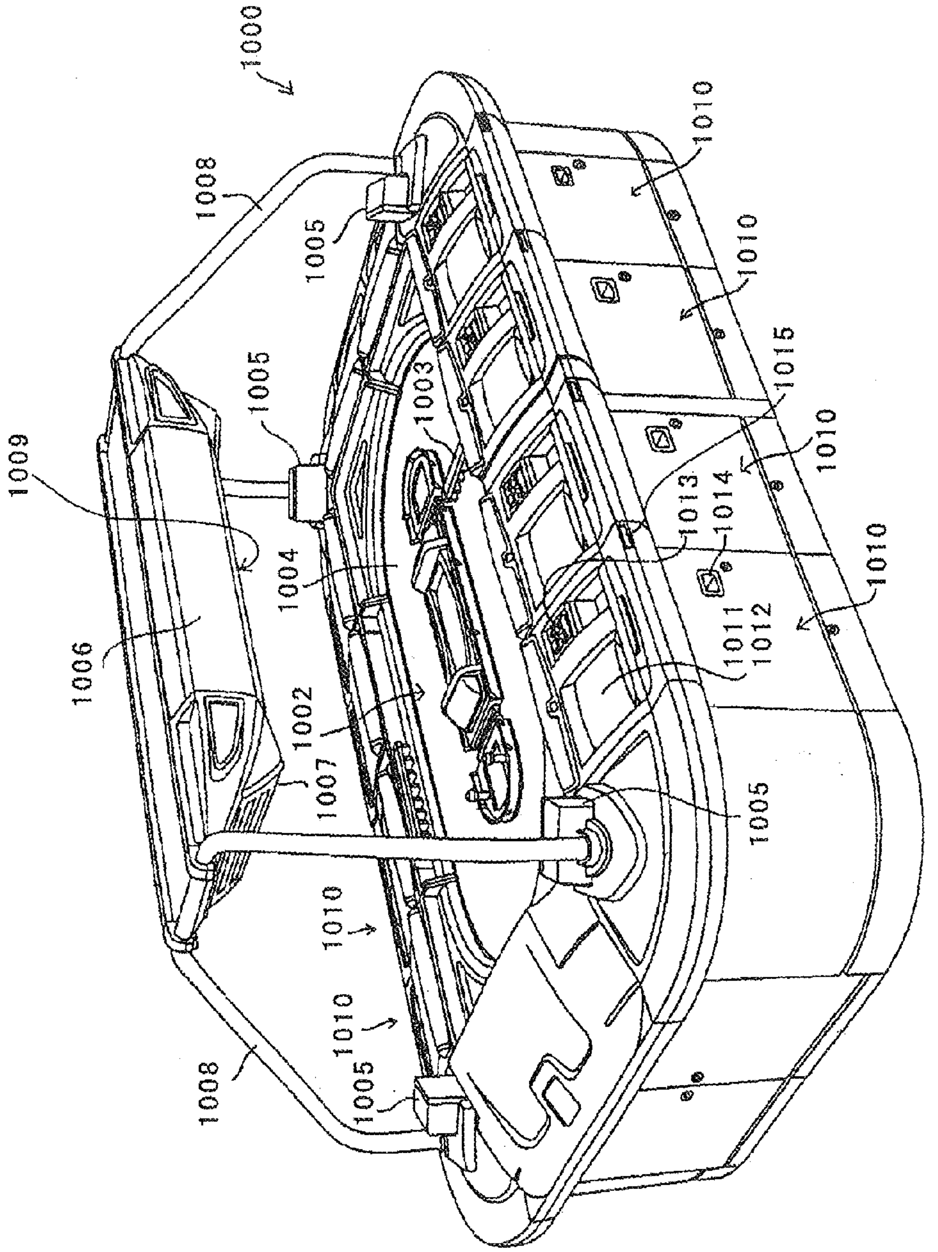
FIG. 2 is an outline view showing one example of a horse-racing game machine constituting the same game system.

FIG. 2 is an outline view showing one example of the horse-racing game machine 1000.

The horse-racing game machine 1000 is provided with a field unit 1002 arranged at the center portion and a plurality of stations 1010 as game apparatuses arranged to surround the field unit 1002. In the field unit 1002, a field surface 1004 as a moving surface that resembles turf on a race track on which a starting gate 1003 as a model is installed, is arranged, and when a plurality of model horses (not shown) are moved within the field surface 1004, a race is developed. Around the field unit 1002, a plurality of speakers 1005 for providing live race coverage, cheers, etc., are placed. Above the field unit 1002, placed are: a display unit 1006 for displaying, for example, a total accumulated token count indicating the number of pieces to be paid out for a total jackpot drawing described later; an illuminating device 1007 for illuminating the field unit 1002; and a camera 1009 that is an imaging unit functioning as imaging means for imaging the field unit 1002. The display unit 1006, the illuminating device 1007, and the camera 1009 are supported by a support column 1008. The speaker 1005 and the illuminating device 1007 that are performance units functioning as performance means of the horse-racing game machine 1000.

In the station 1010, a display 1011 for displaying thereon a game screen according to the progress of the game, and a touch panel 1012 overlapped on a display surface of the display 1011, are arranged. When a player touches a predetermined position of the game screen displayed on the display 1011 according to an instruction on the game screen, the position is detected by the touch panel 1012 and an operation content of the player is recognized by the horse-racing game machine 1000. In the station 1010, further arranged are: a token drop-in unit 1013 into which a token is dropped in by the player; a token payout opening 1014 from which the token is paid out to the player; and a card reading surface 1015 of a card reader as an identification information receiving unit that functions as an identification information receiving means for reading a card ID from a user card.

In the horse-racing game machine 1000, races having the same titles as those of actual horse races held by the Japan Racing Association are sequentially held according to a predetermined cycle. For races held during one year, about 60 races are prepared, and for each race, a time for betting a token, i.e., a time for purchasing a betting ticket; a time during which a race is held by model horses; and a time for displaying race results are secured. The player predicts the order of arrival for each race, and is capable of freely purchasing a betting ticket. The purchasing of the betting ticket is carried out by betting a token, and when the purchased betting ticket matches the results of the race, the player is paid out, as a dividend, tokens of which the number of pieces corresponds to that obtained in accordance with the number of pieces of tokens to be bet and odds.

When a player uses a user card, it not only becomes possible for the player to train his/her own racehorse character (his/her horse) but also to allow the horse to participate in a race. Concretely, the player selects a preferred racehorse character out of a plurality of prepared racehorse characters, and acquires the racehorse character by paying a predetermined number of tokens. Then, the player can train the racehorse character by breaking in (training) the racehorse character in order to enhance capability of the acquired racehorse character. The player can also allow the broken in racehorse character to compete in a race that the player desires.

In the horse-racing game machine 1000 in the present embodiment, the field unit 1002 forms the field surface 1004, and on the field surface 1004, an artificial lawn resembling an actual turf and models such as a starting gate 1003, etc., are arranged. A model horse as a moving body is moved on the field surface 1004.

Figure 3:
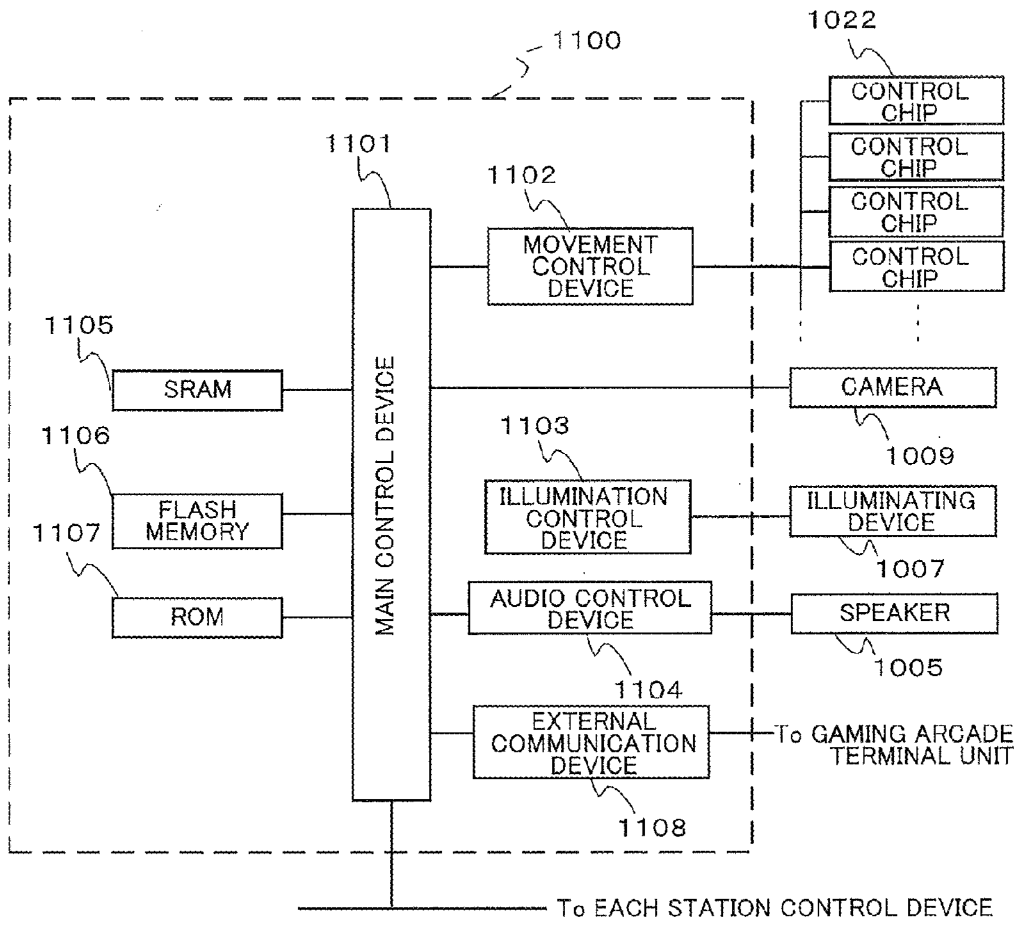
FIG. 3 is a control block diagram showing a main control unit for controlling a whole operation of the same horse-racing game machine in an integrated way.

FIG. 3 is a control block diagram showing a main control unit for controlling the whole operation of the horse-racing game machine 1000 in an integrated way.

Figure 4:
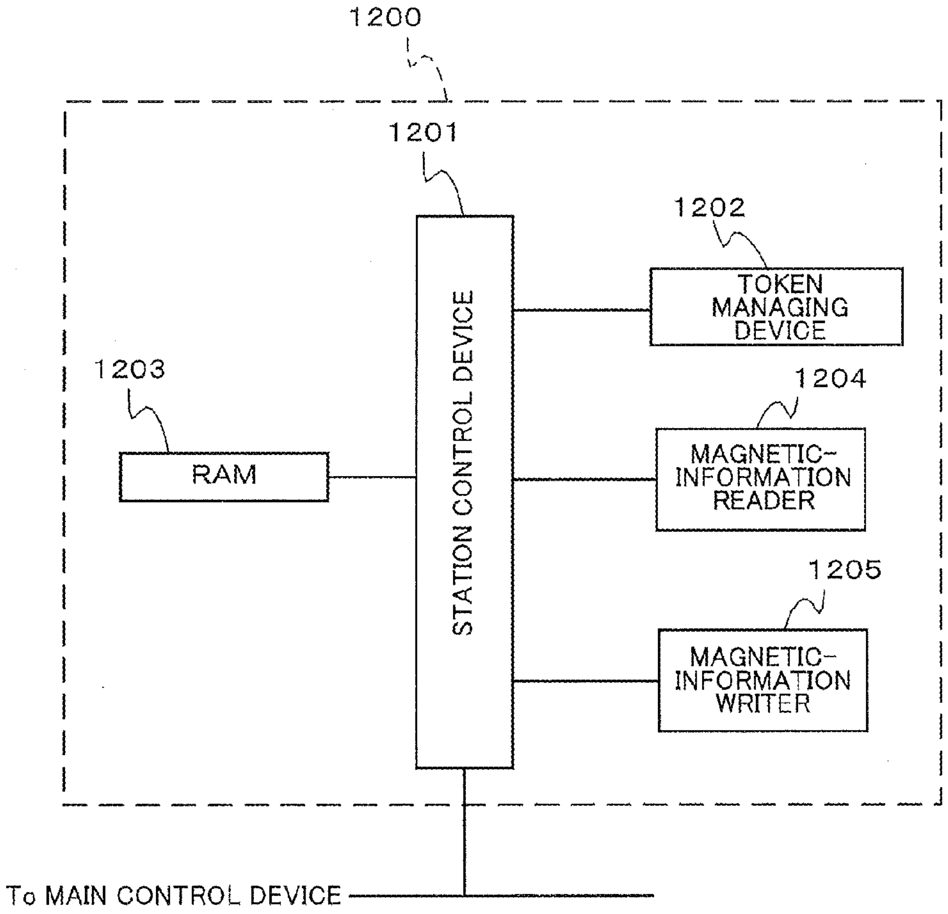
FIG. 4 is a control block diagram showing a station control unit arranged in each station of the same horse-racing game machine.

FIG. 4 is a control block diagram showing a station control unit arranged in each station 1010.

As shown in FIG. 3, the main control unit 1100 placed on the field unit side is provided with: a main control device 1101; a movement control device 1102 for controlling a movement of the model horse in the field unit 1002; an illumination control device 1103 for controlling the illuminating device 1007; an audio control device 1104 for controlling the cheers, the live coverage, etc., provided by the speaker 1005; an SRAM 1105 and a flash memory 1106 for temporarily recording data processed by the main control device 1101; a ROM 1107 in which a program necessary for the game and various types of databases are stored; and an external communication device 1108 for performing data communication via a LAN with an external device such as the gaming arcade terminal unit 5000. The main control device 1101 is connected to each of the movement control device 1102, the illumination control device 1103, the audio control device 1104, the SRAM 1105, the flash memory 1106, the ROM 1107, the external communication device 1108, and the camera 1009. In the ROM 1107, a movement control program that is movement control information for each model horse, various types of data relating to each horse used for the race, a database for a race schedule, etc., are stored.

As shown in FIG. 4, the station control unit 1200 arranged in each station 1010 is provided with: a station control device 1201; a token managing device 1202 for managing a token payout, etc.; a RAM 1203 for temporarily recording various data of a player; and a card reader 1204 as an identification information receiving unit that functions as an identification information receiving means for reading a card ID from the user card placed over a card reading surface 1015. The station control device 1201 is connected to each of the token managing device 1202, the RAM 1203, and the card reader 1204. The station control device 1201 is also connected to various components such as a display 1011 and a touch panel 1012 (shown in FIG. 2) arranged in the station 1010, a token drop-in sensor (not shown) for detecting a token dropped in via a token drop-in unit 1013.

Furthermore, as shown in FIG. 3 and FIG. 4, the station control device 1201 of each station 1010 is connected to the main control device 1101 on the game machine main body side, enabling data communication necessary between these components.

The main control device 1101 of the main control unit 1100, in order to realistically reproduce an actual horse race when holding a race, changes a movement control content of each model horse for each race according to various types of data such as a parameter of each horse. Then, the movement control content is determined before the start of a race, and the movement of the model horse is controlled according to the resultant movement control content. Concretely, before the start of a race, the main control device 1101 of the main control unit 1100 reads out various types of parameters of horses competing in the current race and data such as turf condition, from the ROM 1107, so as to determine the order of arrival for the current race. It is noted that only a first place horse and a second place horse affect the payout of the token to the player, and thus, it is not necessary to determine the orders of all the horses competing in that race and it suffices to determine at least the first place horse and the second place horse. In this case, the movement of the other horses is controlled according to the various types of parameters so that the other horses do not arrive at the finish line first or second. Order of arrival data, the parameter of each horse, etc., determined by the main control device 1101 are forwarded to the movement control device 1102.

The movement control device 1102 that receives the data from the main control device 1101 executes the movement control program recorded in a ROM (not shown) so as to perform movement control on each horse. The movement control device 1102 executing the movement control program calculates a moving pattern of each horse from the parameter, etc., of each horse, and transmits a control command to each control chip 1022 so that each model horse 1060 is moved according to the resultant moving pattern. Concretely, in order to generate a magnetic field allowing each model horse 1060 to move according to the moving pattern of each horse, a control command is transmitted to the control chip of each circuit board for magnetic field generation. Each control chip 1022 that receives the control command controls a current that passes through each coil so that a magnetic force that pulls a south pole of a permanent magnet of each model horse 1060 along a planned moving route of each model horse 1060 is sequentially generated. Thereby, each model horse 1060 can be moved along the planned moving route. As a result, each model horse 1060 of which the movement is controlled by the movement control device 1102 develops the race in the play field.

When the player plays by using the user card, the player places his/her own user card over the card reading surface 1015 before playing. Thereby, a card ID is read from the user card by the card reader 1204, and the card ID is stored in an SRAM 1105 or a flash memory 1106. In the SRAM 1105 or the flash memory 1106, data (such as horse name data, parameter data, and track record information about a winning GI race) relating to the racehorse character trained as a result of the player playing the game is stored in a state of being associated with the card ID.

In the horse-racing game machine 1000, when the player who plays by using the user card ends the game, game situation data (used for restoring, upon resuming the game next time, a game situation established when the game is ended) is saved in a gaming arcade terminal unit in a state of being associated with the card ID of that player. The game situation data includes data relating to the racehorse character trained by the player. Then, when the player resumes the game from a point where the game was last ended, the user places his/her own user card over the card reading surface 1015 before playing. In this way, the game situation data corresponding to the card ID within the user card is downloaded from the gaming arcade terminal unit, and the data is stored in the SRAM 1105 or the flash memory 1106. Thereafter, the game is resumed.

In the present horse-racing game machine 1000, pool ratio data indicating an it's own pool ratio to be described later and preset payout ratio data indicating an it's own total preset payout ratio are stored respectively in the SRAM 1105 or the flash memory 1106 which functions a pool ratio storage unit functioning as pool ratio storage means and a preset payout ratio storage unit functioning as preset payout ratio storage means. Then, in generating odds of each race, the main control device 1101 generates odds which are adjusted so that a ratio (a normal actual payout ratio) of the number of tokens actually paid out to players to the number of tokens consumed by the players in the race in the past comes closer to a normal preset payout ratio obtained by deducting the pool ratio from the total preset payout ratio. Thereby, over the long-term, the normal actual payout ratio can be brought closer to the normal preset payout ratio, by which a gaming arcade is able to secure a stable profit. It is noted that a method for adjusting the normal actual payout ratio is not limited to the method for adjusting odds.

[Pusher Game Machine 2000]

Next, the token-operated game machine 2000 will be explained.

The token-operated game machine 2000 is a pusher game machine.

Figure 5:
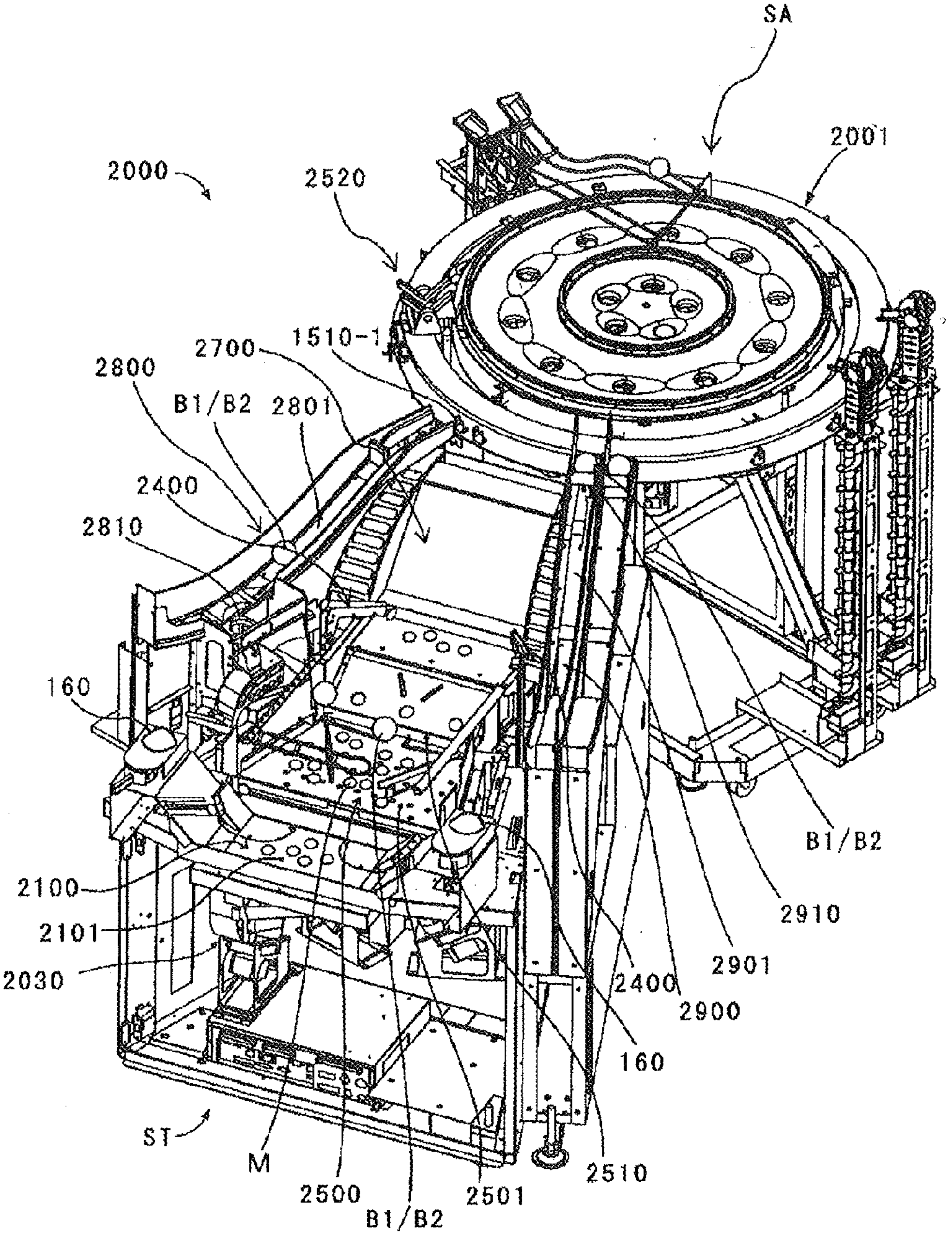
FIG. 5 is an explanatory view for explaining the configuration of a station unit in a pusher game machine constituting the same game system.

FIG. 5 is an explanatory view for explaining the configuration of a station unit ST in the pusher game machine 2000.

In the pusher game machine 2000, four satellite units SA as game apparatuses are arranged to surround a center drawing apparatus (not shown). Each satellite unit SA is provided with the four station units ST, and each player is to individually play a game at each station unit ST. Moreover, each satellite unit SA is provided with one satellite drawing apparatus 2001, and around the satellite drawing apparatus 2001, each station unit ST is lined and placed.

The station unit ST is configured mainly by: a token drop-in mechanism (drop-in unit) 2100; a play field 2500; a station control unit (not shown); and a display unit 2700. In the station unit ST, the token drop-in mechanism 2100 is placed on an upper near side, the display unit 2700 that functions as display means is placed on an upper far side, and the play field 2500 is placed at an upper center. The "near side" means a side on which the player is positioned during the game, the "far side" means a side opposite to the side on which the player is positioned during the game, and the "center" means an area between the "near side" and the "far side."

The token drop-in mechanism 2100 is a mechanism for the player to drop a token M into the pusher game machine 2000 during the game. The token M dropped into the token drop-in mechanism 2100 is conveyed via a token conveyance route (not shown) in the interior of the cabinet of the station unit ST to a lift-up hopper, and the resultant token M is temporarily retained by the lift-up hopper. The lift-up hopper includes: a token retaining unit for accumulating the token M; the lift-up unit for lifting up the token M to a predetermined height; and a token discharge unit (discharge unit) for discharging the token M that is lifted up at a predetermined timing. At a discharge opening of the token discharge unit, arranged is a token discharge route 2400 for leading the discharged token M to the play field 2500 in a manner to laterally swing. An upper end of the lift-up unit is placed above the play field 2500. As a result, the token discharge unit arranged at the upper end of the lift-up unit is placed above the play field 2500. Therefore, the token M temporarily accumulated in the token retaining unit arranged below the play field 2500 is raised above the play field 2500 by the lift-up unit, and thereafter, the raised token M is exited via the token discharge route 2400 from the token discharge unit, out onto the play field 2500.

Within the play field 2500, arranged mainly are: a main table 2501 that is a token mount table for retaining thereon the token M, and the pusher unit 2510 as a token extruding member which is mounted on the main table 2501. The pusher unit 2510 includes: a top surface (this is called a sub table) for retaining thereon the token M; a sloping table on which the token M that falls from the sub table slides; and a push-forward wall that pushes forward the token M retained on the main table 2501. Moreover, the pusher unit 2510, which is arranged to enable sliding on the main table 2501 in the play field 2500, makes a back-and-forth slide movement in a constant cycle or an arbitrary cycle. A part (far side) of the pusher unit 2510 is housed in a housing part (described later) arranged beneath the display unit 2700. The pusher unit 2510, which slides to come out of and into the housing part, makes a back-and-forth reciprocating movement.

With the sub table, a frame member of the display unit 2700 comes into contact in a manner to enable sliding. Therefore, when the pusher unit 2510 moves to a direction in which it is housed in the housing part, the token M on the sub table is pushed forward by the frame member. By the pushing forward, some tokens M on the sub table fall onto the sloping table. Some tokens M that fall from the sub table enter into an opening (this is called a "chucker") that is a token pass-through opening arranged on the sloping table. The remaining tokens M fall directly onto the main table 2501 and are retained on the main table 2501.

The tokens M on the main table 2501, similar to the tokens M on the sub table, are pushed forward by the slide movement of the pusher unit 2510. That is, the pusher units 2510 are seamlessly mounted on the main table 2501, and thus, when the pusher unit 2510 is moved in a discharge direction from the housing part, the tokens M on the main table 2501 are pushed forward by the push-forward wall on the front surface of the pusher unit 2510. By the pushing forward, some tokens M on the main table 2501 fall. Out of the tokens M that fall, the token M that falls from an end on the player side (this is called a "front end") to a token fall groove is paid to the player, and the other tokens M, e.g., the tokens M that fall from both sides (these are called "side ends") of the main table 2501 are stocked in a predetermined retaining unit within the station unit ST.

Besides, as shown in FIG. 5, the station unit ST includes a ball drop-in mechanism 2800 on at least one side. The ball drop-in mechanism 2800 is configured to drop balls B1 and B2 that are spherical objects (as differently shaped objects described later) into the play field 2500, and includes a ball drop-in slope 2801 and a ball drop-in position drawing mechanism 2810. The balls B1 and B2 are objects for drawing used for executing a bingo game described later.

The ball drop-in slope 2801, which is configured to lead the balls B1 and B2 dropped in from a ball carrier 2520 described later to the ball drop-in position drawing mechanism 2810 by gravity, is formed as a downhill slope. The ball drop-in position drawing mechanism 2810 is configured to draw a position on the play field 2500 onto which the balls B1 and B2 are dropped. Thus, the balls B1 and B2 dropped in from the ball carrier 2520 described later to the station unit ST are dropped in via the ball drop-in slope 2801 and the ball drop-in position drawing mechanism 2810 onto the play field 2500.

As shown in FIG. 5, the station unit ST includes a ball transportation mechanism 2900 on at least one side. The ball transportation mechanism 2900 is configured, when the balls B1 and B2 fall from the main table 2501 in the play field 2500 onto the token fall groove arranged on the near side, to transport the balls B1 and B2 to the satellite drawing apparatus 2001, and includes a ball conveying route (not shown), a ball transporting unit 2910, and a ball transporting unit traveling slope 2901. The ball conveying route is arranged below the front end of the main table 2501, and leads the balls B1 and B2 that fall from the front end to the ball transporting unit 2910. The ball transporting unit 2910 is configured to transport the balls B1 and B2 received via the ball conveying route, to the satellite drawing apparatus 2001, and travels on the ball transporting unit traveling slope 2901 according to control of the control unit of the station unit ST. The balls B1 and B2 transported to the satellite drawing apparatus 2001 are handed over to the ball carrier 2520.

Moreover, the station unit ST includes a token payout mechanism 2030, and as a result of the token payout mechanism being driven, the tokens M of which the number of pieces is equal to that of the tokens M that fall onto the token fall groove from the front end of the main table 2501 are discharged to the retaining unit 2101 of the token drop-in mechanism 2100.

Next, a control system of the pusher game machine 2000 will be explained.

Figure 6:
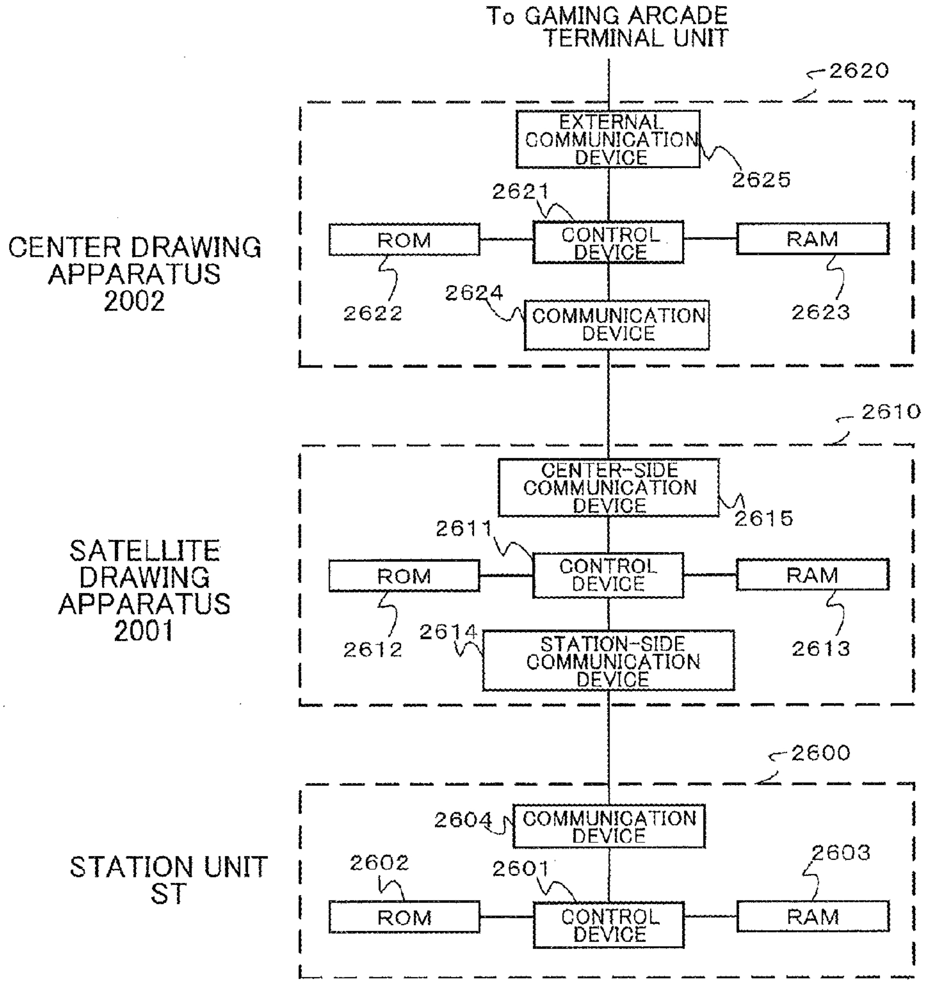
FIG. 6 is a block diagram showing a main configuration of a game control system of the same pusher game machine.

FIG. 6 is a block diagram showing a main configuration of a game control system of the pusher game machine 2000. In this block diagram, for the sake of explanation, configurations of a drive control system for driving each unit according to the game progress and any other systems are omitted.

The game control system of the pusher game machine 2000 is configured mainly by: a control unit 2600 at the station unit ST; a control unit 2610 of the satellite drawing apparatus 2001; and a control unit 2620 of the center drawing apparatus 2002. The control unit 2600 of the station unit ST mainly assumes a role of overall process control of a slot game and a bingo game described later, the control unit 2610 of the satellite drawing apparatus 2001 mainly assumes a role of control of a physical drawing of the bingo game and transportation control of the balls B1 and B2, and the control unit 2620 of the center drawing apparatus 2002 mainly assumes a role of a single-unit jackpot drawing control described later and overall control of the pusher game machine 2000.

The control unit 2600 of the station unit ST is configured mainly by: a control device 2601; a ROM 2602; a RAM 2603; a communication device 2604; and a card reader 2605 as an identification information receiving unit that functions as identification information receiving means. The control device 2601 executes various types of programs stored in the ROM 2602 so as to perform various types of controls. The ROM 2602 stores, for example, execution programs for various types of controls that should be carried out in the control unit 2600 of the station unit ST. The RAM 2603 is for temporarily storing various types of data or information. The communication device 2604 is for performing data communication with the control unit 2610 of the satellite drawing apparatus 2001. The card reader 2605 is for reading a card ID from a user card held by a user. Although not shown, the station unit ST includes a performance unit such as a speaker and an illuminating device, used for various types of performances, and the control device 2601 controls these performance units so as to carry out various types of performances.

The control unit 2610 of the satellite drawing apparatus 2001 is configured mainly by: a control device 2611; a ROM 2612; a RAM 2613; a station-side communication device 2614; and a center-side communication device 2615. The control device 2611 executes various types of programs stored in the ROM 2612 so as to perform various types of controls. The ROM 2612 stores, for example, execution programs for various types of controls that should be carried out in the control unit 2610 of the satellite drawing apparatus 2001. The RAM 2613 is for temporarily storing various types of data or information. The station-side communication device 2614 is for performing data communication with the control unit 2600 of the each station unit ST belonging to the satellite unit SA. The center-side communication device 2615 is for performing data communication with the control unit 2620 of the center drawing apparatus 2002. Although not shown, the satellite unit SA includes a performance unit, such as a speaker and an illuminating device, used for various types of performances, and the control device 2611 controls these performance units so as to carry out various types of performances.

The control unit 2620 of the center drawing apparatus 2002 is configured mainly by: a control device 2621; a ROM 2622; a RAM 2623; a communication device 2624; and an external communication device 2625. The control device 2621 executes various types of programs stored in the ROM 2622 so as to perform various types of controls. The ROM 2622 stores, for example, execution programs for various types of controls that should be carried out in the control unit 2620 of the center drawing apparatus 2002. The RAM 2623 is for temporarily storing various types of data or information. The communication device 2624 is for performing data communication with the control unit 2610 of each satellite unit SA. The external communication device 2625 is for performing data communication via a LAN with an external device such as a gaming arcade terminal unit 5000. Although not shown, the center drawing apparatus 2002 includes a performance unit, such as a speaker and an illuminating device, used for various types of performances, and the control device 2621 controls these performance units so as to carry out various types of performances.

Figure 7:
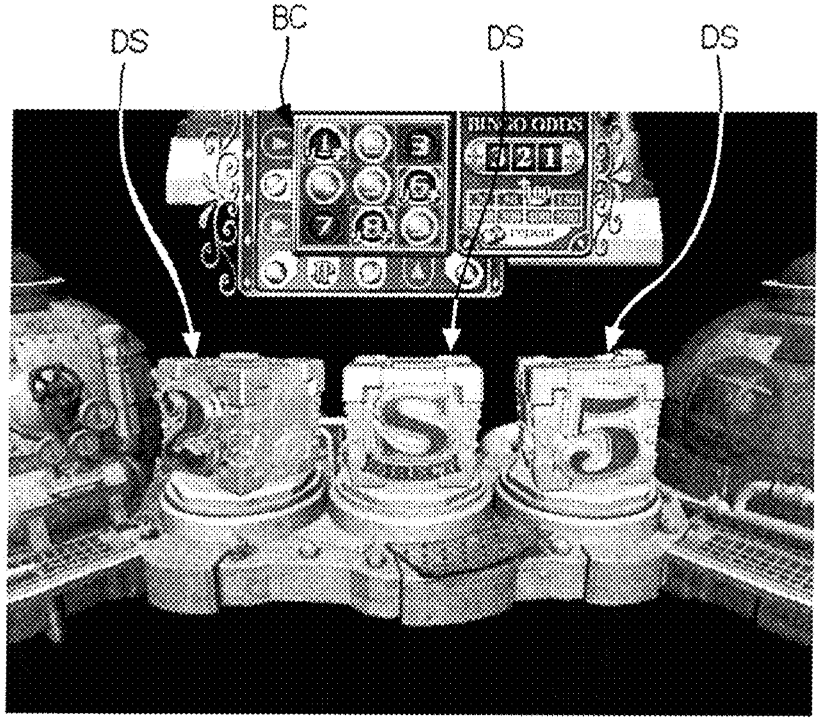
FIG. 7 is an explanatory view showing an example of a slot game screen displayed on a display unit of the same pusher game machine.
Figure 8:
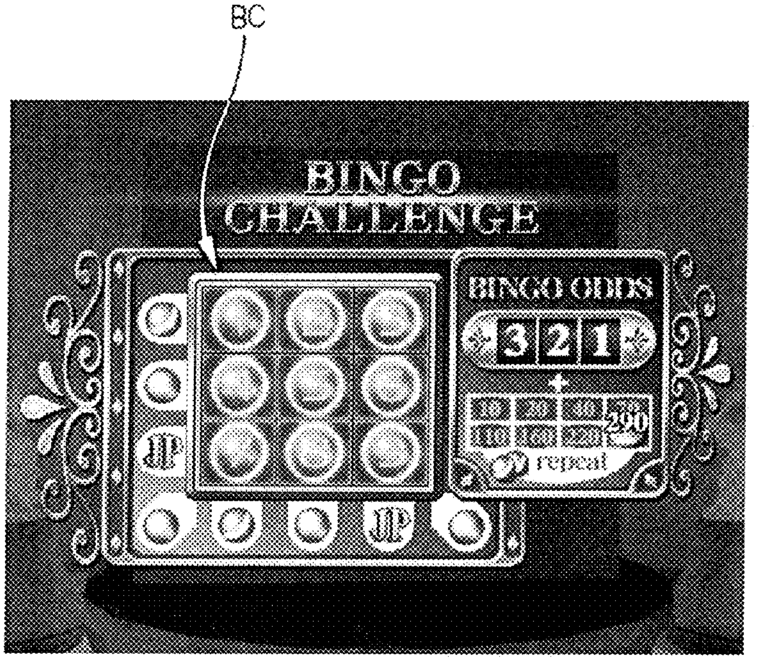
FIG. 8 is an explanatory view showing an example of a bingo game screen displayed on the display unit of the same pusher game machine.

In the above-described configuration, in the pusher game machine 2000, in addition to the pusher game, a slot game is carried out by displaying a slot game screen as shown in FIG. 7 on the display unit 2700, and a bingo game is carried out by displaying a bingo game screen as shown in FIG. 8 on the display unit 2700. In the pusher game machine 2000, a single-unit jackpot drawing using the center drawing apparatus 2002 is also carried out. On the display unit 2700, a single-unit accumulated token count indicating the number of pieces to be paid out in a single-unit jackpot drawing described later and a total accumulated token count indicating the number of pieces to be paid out in a total jackpot drawing described later are displayed.

The slot game is a digital drawing game in which the control unit 2600 at the station unit ST mainly performs a drawing digitally. This slot game is started under the condition that the token M enters into any one of chuckers arranged on the sloping table at the pusher unit 2510. The slot game screen shown in FIG. 7 is displayed on the display unit 2700 during a period when the bingo game described later does not progress. When the token M enters into any one of the chuckers and thereby the slot drawing start condition is satisfied, the control unit 2600 performs display control to rotate three dice-shaped slots DS. In the digital drawing of the slot game, the control unit executes a predetermined drawing program, and checks a generated random number in reference to a predetermined winning table so as to determine whether to win any payout-symbol combination or lose. Thereafter, where a winning payout-symbol combination is determined, the control unit 2600 performs display control to stop the rotation of the three dice-shaped slots DS so that a combination of symbols relating to the winning payout-symbol combination is stopped and displayed on the display unit 2700.

In the present embodiment, as a payout-symbol combination for a digital drawing, prepared are: a minor payout-symbol combination A in which three tokens are supplied to the play field 2500; a minor payout-symbol combination B in which eight tokens are supplied to the play field 2500; a ball supply payout-symbol combination in which the ball B1 is supplied to the play field 2500; a normal bonus payout-symbol combination in which thirty tokens are supplied to the play field 2500; a probability-change bonus payout-symbol combination in which thirty tokens are supplied to the play field 2500 and a winning table at which a winning probability is set to be higher is used in subsequent digital drawings; a direct satellite payout-symbol combination in which the ball B1 is directly supplied to the satellite drawing apparatus 2001; a direct center payout-symbol combination in which the ball B1 is directly supplied to the center drawing apparatus 2002, and other payout-symbol combinations. The winning probability of each of these payout-symbol combinations is set to be lowered according to the above-described order. It is noted that, which payout-symbol combination is prepared or to which winning probability of each of the payout-symbol combinations is set is determined arbitrarily. For example, it may be possible to configure that various benefits are given to a player such as direct payout of tokens M to the player. Then, when these payout-symbol combinations are won, the control device 2601 of the station unit ST controls the speaker or the illumination device, etc., so as to carry out individual performance to liven up the winning.

The bingo game is a physical drawing game which progresses by a physical drawing using two types of balls B1 and B2 and the satellite drawing apparatus 2001. The bingo game progresses by the control unit 2610 of the satellite drawing apparatus 2001 and the control unit 2600 at the station unit ST. In the bingo game, the control unit 2610 of the satellite drawing apparatus 2001 mainly controls a drawing for determining winning bingo numbers of the bingo game. The control unit 2600 of each of the station units ST belonging to the satellite unit SA including the satellite drawing apparatus 2001 is mainly in charge of controlling the performance of the bingo game, a decision of the establishment of BINGO, and so on. In the present embodiment, the balls B1 and B2 are moved by the satellite drawing apparatus 2001, by which a physical drawing is carried out in which one winning bingo number (a winning target) is selected from a plurality of bingo numbers (drawing targets) different from each other. In the physical drawing of the present embodiment, one winning bingo number is selected from the bingo numbers of "1" through "9". Then, array information of the bingo card having these bingo numbers of "1" through "9" arrayed in a matrix is generated individually for each of the station units ST by the control unit 2600 that is as an array-information producing unit which functions as array-information producing means for the station unit ST, for example. Thereafter, a bingo card image BC in which images of the bingo numbers of "1" through "9" (drawing target images) are arrayed according to the array information is displayed on the display unit 2700 of each of the station units ST, as shown in FIG. 8. Then, when the BINGO is established, the control device 2601 of the station unit ST or the control device 2611 of the satellite unit SA each controls the speaker, the illuminating device, etc., so as to carry out an individual performance to liven up the establishment of BINGO.

In the single-unit jackpot drawing, when either one of conditions under which the single-unit jackpot drawing is started is satisfied, i.e., the balls B1 and B2 are thrown into a winning spot to which a right of starting a single-unit jackpot drawing in the center drawing apparatus 2002 in the physical drawing in the satellite drawing apparatus 2001 in the above-described bingo game is assigned, or the center combination is directly won in the above-described slot game, the control device 2621 of the control unit 2620 in the center drawing apparatus 2002 executes a single-unit jackpot execution program stored in the ROM 2622 so as to start the single-unit jackpot drawing. Then, in the center drawing apparatus 2002, the ball B1 is moved thereby to perform the physical drawing that determines whether a single-unit jackpot award is won or lost (including a case where awards other than the single-unit jackpot award are won). When the single-unit jackpot award is won, the control device 2621 of the center drawing apparatus 2002 controls the speaker, the illuminating device, etc., so as to carry out an individual performance to liven up the winning of the single-unit jackpot award.

Moreover, when the single-unit jackpot award is won, the control device 2621 reads out the single-unit JP retaining count data that is payout amount data from the RAM 2623, and performs a process for supplying the tokens M having the number of pieces indicated by a count value of that data, to the play field 2500 of the station unit ST that has satisfied the condition under which the jackpot drawing is started. At this time, another option would be: a token supply command is output to the control device 2601 of the control unit 2600 at the station unit ST from the control device 2621, and under the control of the control device 2601, the token M is supplied to the play field 2500 by using a method similar to a normal token supply process. In this case, however, the number of pieces of tokens to be supplied when the single-unit jackpot award is won is obtained by cumulatively adding the number of pieces equivalent to a part of the number of pieces of tokens to be dropped into all the station units ST (for example, 0.03 pieces) from a time when the single-unit JP retaining count data is reset to an initial value (for example, 500 pieces), therefore, it is a great number. For this reason, instead of the normal token supply process, a process using an original token supply mechanism may be optionally adopted. This is preferable as a performance carried out when the single-unit jackpot award is won. Moreover, when the single-unit jackpot award is won, the control device 2621 resets the single-unit JP retaining count data stored in the RAM 2623, to the initial value.

When playing by using the pusher game machine 2000, the player places the user card over a card reading surface (not shown) before playing. Thereby, the card ID is read from the user card by the card reader 2605, and the card ID is stored in a RAM 2603. In the RAM 2603, play information obtained when the player plays by using the pusher game machine 2000 (such as an accumulated token drop-in count, a combination of symbols that is won in a slot game, the number of times of bingos to be established in a bingo game, and the number of times to be won in a single-unit jackpot award) is stored in a state of being associated with the card ID. When the player who plays by using the user card ends the game, the play information stored in the RAM 2603 is saved in the gaming arcade terminal unit in a state of being associated with the card ID. If the player places his/her own user card over the card reading surface before playing next time, the play information corresponding to the card ID within the user card is downloaded from the gaming arcade terminal unit, and this data is stored in the RAM 2603. As a result, a play result obtained from playing is added to the play information.

In the present pusher game machine 2000, the pool ratio data indicating an it's own pool ratio to be described later and the preset payout ratio data indicating an it's own total preset payout ratio are stored in the RAM 2623, which is a pool ratio storage unit functioning as pool ratio storage means and also a preset payout ratio storage unit functioning as preset payout ratio storage means, of the center drawing device 2002. Then, the control device 2601 of the station unit ST adjusts a winning probability of, for example, the slot game so that a ratio (a normal actual payout ratio) of the number of tokens actually paid out to players to the number of tokens consumed by the players in games (games other than a total jackpot drawing) such as the slot game, the bingo game and the single-unit jackpot drawing in the past comes closer to a normal preset payout ratio obtained by deducting the pool ratio from the total preset payout ratio. Thereby, over the long-term, the normal actual payout ratio can be brought closer to the normal preset payout ratio, by which a gaming arcade can secure a stable profit. It is noted that a method for adjusting the normal actual payout ratio is not limited to the method for adjusting the winning probability of the slot game.

[Slot Machine 3000]

Next, the token-operated game machine 3000 will be explained.

The token-operated game machine 3000 as a game apparatus is a slot machine.

Figure 9:
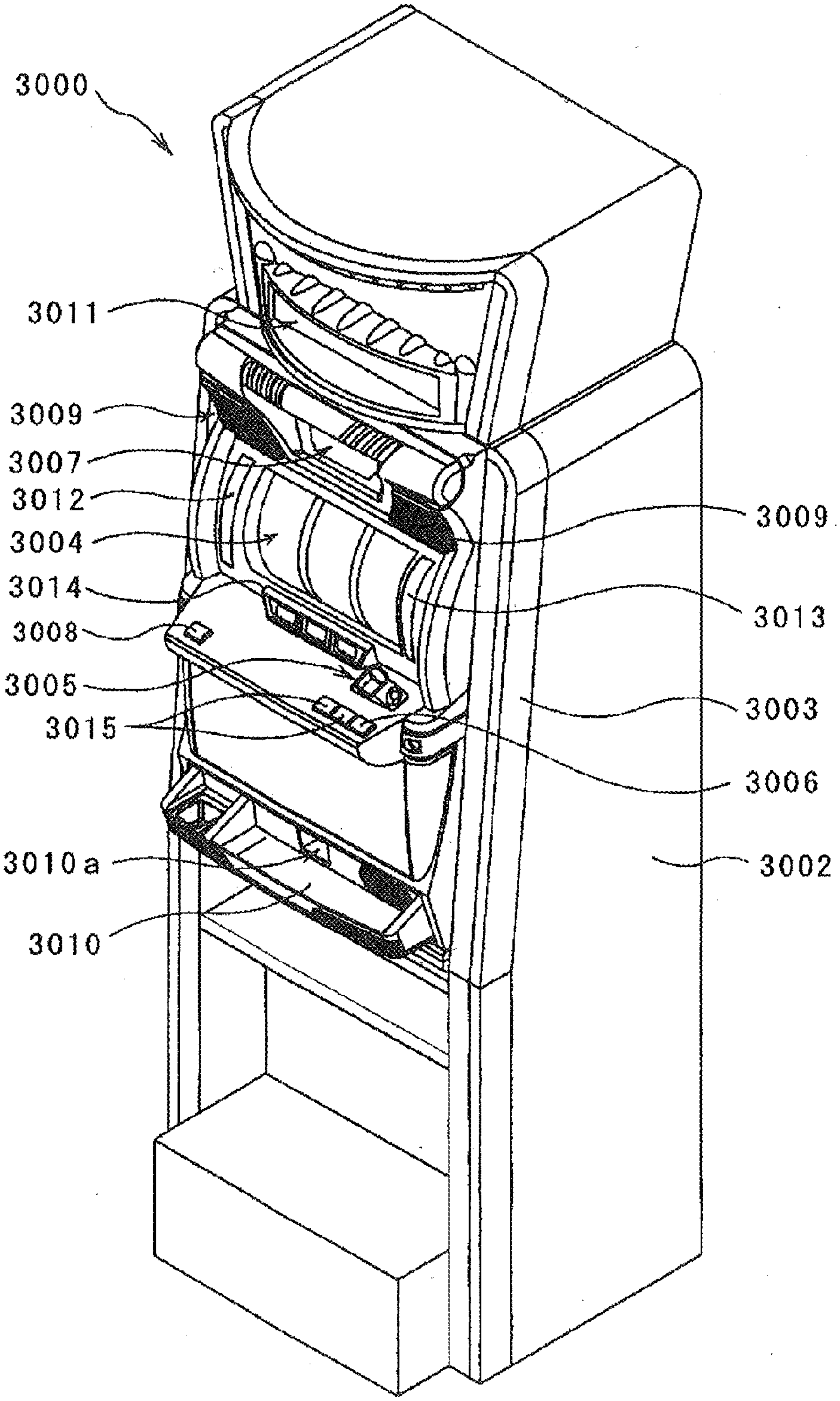
FIG. 9 is a perspective view showing the outline of a slot machine constituting the same game system.

FIG. 9 is a perspective view showing the outline of a slot machine 3000 according to the present embodiment.

The slot machine 3000 includes a box-type cabinet 3002, a front panel 3003 attached to a front surface side of the cabinet 3002 in a freely openable and closable manner, and other components. On the front panel 3003, arranged are: a display window 3004 for displaying part of a varying display unit described later; a token drop-in opening 3005; a start button 3006 as a start operation device; a dice display window 3007; a credit settlement button 3008; a speaker 3009; a token receiving tray 3010 having a token payout opening 3010*a*; a performance panel 3011; a card reading surface 3013*a*; a count display unit 3014; a BET operation unit 3015; and so on. The speaker 3009 and the performance panel 3011 that are performance units function as performance means of the slot machine 3000. Moreover, on the performance panel 3011, various types of information such as a total accumulated token count indicating the number of pieces of payouts in the total jackpot drawing described later are displayed.

Inside the cabinet 3002, three reels that as three varying display units of which the outer peripheral surface is printed with a plurality of types of symbols are assembled. The three reels (hereinafter, in the order of a "left reel", a "middle reel", and a "right reel") are each rotated and driven by a reel drive motor (not shown) configured by a stepping motor. These reels are printed with a plurality of types of symbols such as "white 7", "blue 7", "green 7", "red 7", "cherry", and "blank" in a predetermined order. In the present embodiment, the symbol of "blank" configures neither one of the payout-symbol combinations. A main control circuit board on which electronic circuits are formed by various types of electronic components such as a CPU and a ROM, a token payout device having a token hopper capable of containing a large number of pieces of tokens, an internal speaker, and any other similar components are also assembled.

Figure 10:
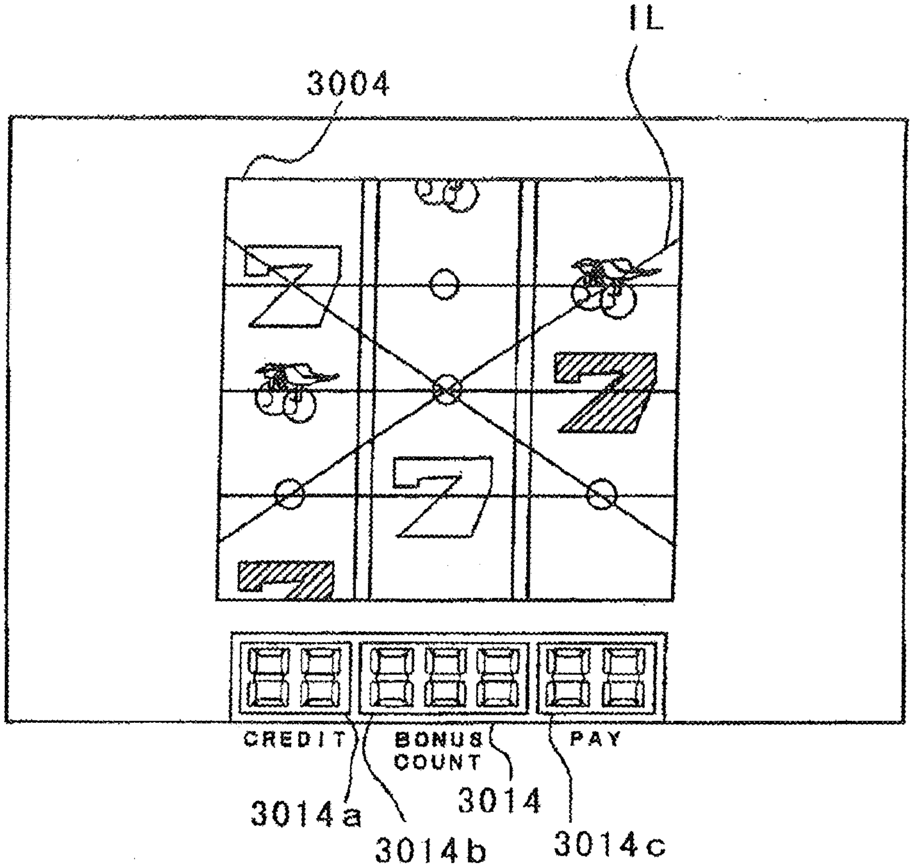
FIG. 10 is a detailed front view showing part of a front panel of the same slot machine.

FIG. 10 is a detailed front view showing part of the front panel 3003.

Symbols formed by about three images at a predetermined rotation position of each reel are to be visually recognized by a player through the display window 3004. In this display window 3004, five winning lines IL are depicted across all of the reels. When symbols relating to a payout-symbol combination corresponding to an award group previously defined on these winning lines IL become all the same in a combination (hereinafter, this is simply referred to as the "symbols become all the same in a payout-symbol combination"), a game value is imparted to a player, such as the tokens are paid out to the token receiving tray 3010 and a current period is moved to a special game period during which a special game can be played. It is noted that, in the slot machine 3000 according to the embodiment, the five winning lines IL are arranged; however, the number of winning lines may be optionally increased or decreased. Moreover, the winning line may suffice to be visually recognized by a CPU 17*a*, described later, for performing stop control of the slot machine, rather than to be visually recognized by the player.

The count display unit 3014 is provided with a credit display 3014*a*, a bonus-count display 3014*b*, a token payout count display 3014*c*, etc.

The BET operation unit 3015 is configured by two buttons, i.e., a 1BET button 3015*a* and a max BET button 3015*b*.

Figure 11:
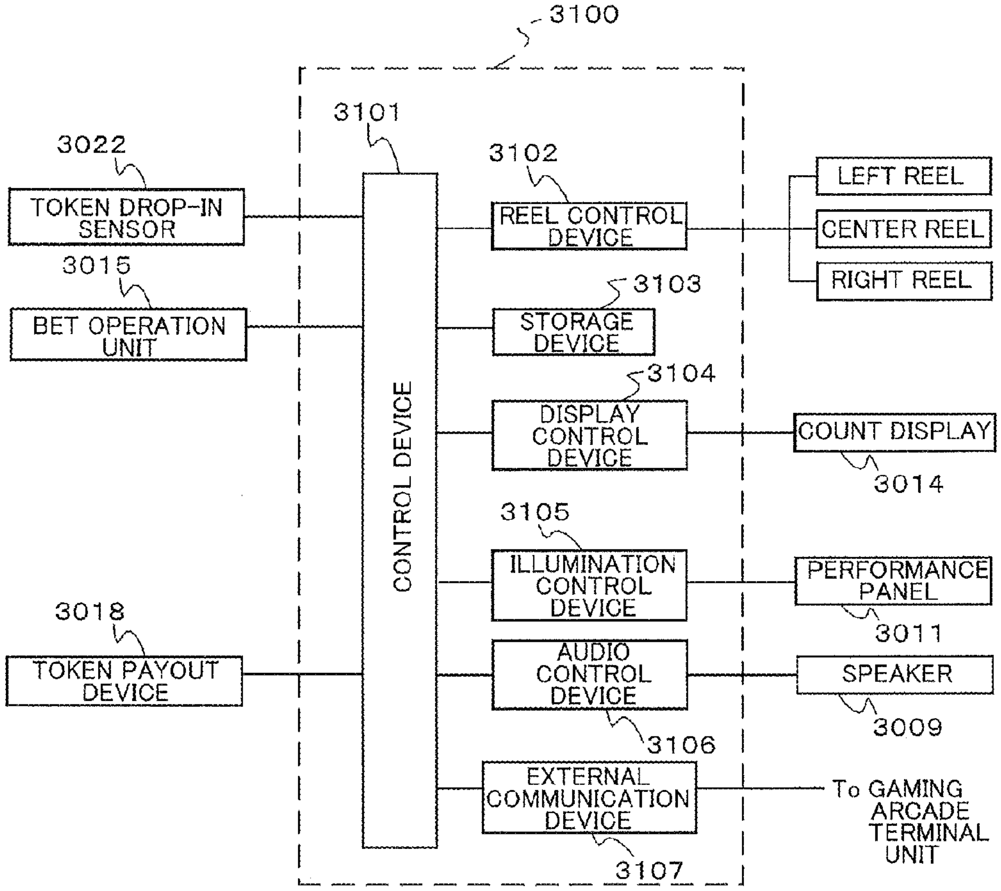
FIG. 11 is a control block diagram relating to a main configuration of the same slot machine.

FIG. 11 is a control block diagram relating to a main configuration of the slot machine 3000. The main control unit 3100 of the slot machine 3000 includes: a control device 3101; a reel control device 3102 for performing drive control for the three reels; a storage device 3103 in which various types of programs necessary for the game, various types of databases, etc., are stored; a display control device 3104 for performing display control of the count display unit 3014; an illumination control device 3105 for controlling illumination of the performance panel 3011, etc.; an audio control device 3106 for controlling a sound output from the speaker 3009; and an external communication device 3107 for performing a data communication with an external apparatus such as the gaming arcade terminal unit 5000 via a LAN. The main control device 1101 is connected not only to these devices but also to, for example, the token drop-in sensor 3022, the card reader 3013 as an identification information receiving unit that functions as identification information receiving means for reading a card ID from a user card placed over the card reading surface 3013*a*, the BET operation unit 3015, and the token payout device 3018.

Next, a flow of the game of the slot machine 3000 will be explained.

Before the game is started, as a preparation, a player first needs to drop a token into the token drop-in opening 3005. When a token is dropped by the player into the token drop-in opening 3005, the token passes through a passage (not shown) and falls onto the token hopper. In this passage, various components are arranged such as a fall opening through which a token smaller than a standard falls back to the token payout opening 3010*a*, a token block solenoid for returning or permitting the token to the token payout opening 3010*a* by blocking the passage of the token, and a token drop-in sensor 3022 configured by, for example, a photo sensor for detecting the passed tokens one by one. A token detection signal output from the token drop-in sensor 3022 that detects the token is forwarded to the control device 3101 of the main control unit 3100. In receipt thereof, by means of the display control device 3104, the control device 3101 performs control to increase a display count value by one on the credit display 3014*a* and to increase a value of credit count data stored in the storage device 3103 by one. Normally, a plurality of pieces of tokens are dropped in at once so as to increase the number of pieces of credit to a certain extent. When the player operates the BET operation unit 3015 to perform a bet operation, the control device 3101 decreases the value of the credit count data stored in the storage device 3103 by as much as the number of pieces to be bet, and at the same time, performs control to decrease the display count value on the credit display 3014*a* by as much as the number of pieces to be bet. Moreover, the control device 3101 recognizes the winning line IL that has become effective according to the number of pieces to be bet. It is noted that, unless the symbols become all the same in the payout-symbol combination on the effective winning line IL, the winning is not granted even when the symbols become all the same in the payout-symbol combination on an ineffective winning line IL.

When the start button 3006 is operated by the player, the control device 3101 that is a start-command receiving unit executes a start-command receiving program stored in the storage device 3103 thereby to function as start-command receiving means so as to receive a varying-display start command from its start button 3006. The control device 3101 that has received this varying-display start command, first, starts rotation drive of all the reels by the reel control device 3102. Further, the control device 3101 that has received the varying-display start command executes an award-group drawing program stored in the storage device 3103 so as to perform an internal drawing. In this case, the control device 3101 functions as means for performing an internal drawing to determine a winning in which any award group is selected out of a plurality of award groups or a loss in which neither award group is selected. The internal drawing is carried out by checking random number data forwarded from a random-number generating circuit with a value on an award group drawing table stored in the storage device 3103. On this award-group drawing table, each random number is associated with any award group or the loss. As a result of such an association, any one of the award groups is won at an individual predetermined probability, or the loss occurs at a predetermined probability.

Rotation positions of the reels that start the rotation drive are respectively detected by a reel position sensor (not shown). The reel control device 3102 performs an arithmetic operation on the rotation speed of the reel based on an output signal from each reel position sensor. When the rotation speed of the reel is stabilized, the reel control device 3102 becomes capable of recognizing a position of each symbol on each reel based on the output signal from each reel position sensor. Then, the control device 3101 executes a stop control program stored in the storage device 3103, and based on a drawing result of the above-described internal drawing, performs stop control of the reel by the reel control device 3102 so that a combination of predetermined symbols is stopped and displayed on the winning line. Concretely, when any one of the award groups is won by the internal drawing, the control device 3101 performs stop control so that a combination of symbols relating to a payout-symbol combination corresponding to the award group that has won is stopped and displayed on the winning line IL. On the other hand, in the case of the loss as a result of neither one of the award groups being selected by the internal drawing, the control device 3101 performs stop control so that a combination of symbols corresponding to neither award group is stopped and displayed on the winning line IL.

In a normal game, the internal drawing is carried out by using an award-group drawing table corresponding to that normal game. Examples of award groups that may be won by the internal drawing of this normal game include token payout awards of: a cherry award corresponding to a cherry combination formed by "cherry-ANY (any symbol pattern)-ANY (any symbol pattern)"; an ANY7 award corresponding to an ANY7 combination formed by a plurality of colors of "7" that are "ANY7 (any color of "7")-ANY7 (any color of "7")-ANY7 (any color of "7")"; a white 7 award corresponding to a white 7 combination formed by "white 7-white 7-white 7"; a blue 7 award corresponding to a blue 7 combination formed by "blue 7-blue 7-blue 7"; a green 7 award corresponding to a green 7 combination formed by "green 7-green 7-green 7"; and a red 7 award corresponding to a red 7 combination formed by "red 7-red 7-red 7." When any one of the token payout awards is won as a result of the internal drawing and the symbols corresponding thereto become all the same in a winning combination on the winning line IL, the control device 3101 causes the token payout count display 3014*c* of the count display unit 3014 to display the number of pieces of tokens to be paid out corresponding to the winning award. Then, the control device 3101 performs a token payout process for paying out the number of pieces of tokens corresponding to the winning award. Concretely, the control device 3101 increases a value of the credit count data stored in the storage device 3103 by as much as the number of pieces of tokens to be paid out, and at the same time, performs control to increase the token credit on the credit display 3014*a* by as much as the number of pieces of tokens to be paid out. When a token credit upper limit value is exceeded, the exceeded amount is paid out to the token receiving tray 3010 from the token payout opening 3010*a* by the token payout device 3018. According to the order in which the above-described award groups are described, the number of pieces of tokens that are paid out is larger.

When playing by using the slot machine 3000, the player places the user card over the card reading surface 3013*a* before playing. As a result, the card ID is read from the user card by the card reader 3013, and the resultant card ID is stored in the storage device 3103. In the storage device 3103, play information (such as an accumulated token drop-in count, and the number of times to be won for the red 7 award) obtained when the player plays by using the slot machine 3000 is stored in a state of being associated with the card ID. When the player who plays by using the user card ends the game, the play information stored in the storage device 3103 is saved in the gaming arcade terminal unit in a state of being associated with the card ID. When the player places his/her own user card over the card reading surface 3013*a* before playing next time, the play information corresponding to the card ID within the user card is downloaded from the gaming arcade terminal unit, and the data is stored in the storage device 3103. Thereafter, a play result obtained from playing is added to the play information.

In the present pusher game machine 2000, the pool ratio data indicating an it's own pool ratio to be described later and the preset payout ratio data indicating an it's total preset payout ratio are stored in the storage device 3103 which is a pool ratio storage unit functioning as pool ratio storage means and also a preset payout ratio storage unit functioning as preset payout ratio storage means. Then, the control device 3101 adjusts a winning probability of, for example, the internal drawing so that a ratio (a normal actual payout ratio) of the number of tokens actually paid out to players to the number of tokens consumed by the players in the slot game in the past comes closer to a normal preset payout ratio obtained by deducting the pool ratio from the total preset payout ratio. Thereby, over the long-term, the normal actual payout ratio can be brought closer to the normal preset payout ratio, by which a gaming arcade can secure a stable profit. It is noted that a method for adjusting the normal actual payout ratio is not limited to the method for adjusting the winning probability of the internal drawing.

[Jackpot System]

Next, an explanation will be made for a total jackpot drawing to be performed in the present system.

Figure 12:
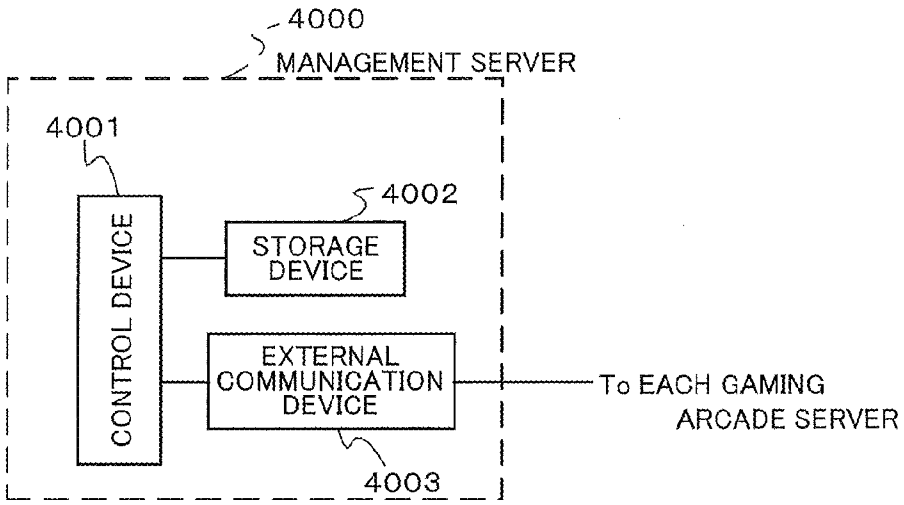
FIG. 12 is a control block diagram of a management server.

FIG. 12 is a control block diagram showing a management server 4000 for controlling the progress of the total jackpot drawing together with each gaming arcade terminal unit 5000.

The management server 4000 is substantially configured with a control device 4001, a storage device 4002 which is a payout amount storage unit functioning as payout amount storage means and also a pool amount storage unit functioning as pool amount storage means, and an external communication device 4003. The storage device 4002 stores various control programs and total accumulated token count data which is the payout amount data of the present system as a whole. The storage device 4002 also stores gaming arcade-specific pool count data (pool amount data) indicating pool counts of individual gaming arcades sent from the gaming arcade terminal unit 5000 (pool counts of all token-operated game machines installed inside the gaming arcade concerned). The external communication device 4003 is a device for making data communication with external devices such as the gaming arcade terminal unit 5000 of each gaming arcade via WAN.

Figure 13:
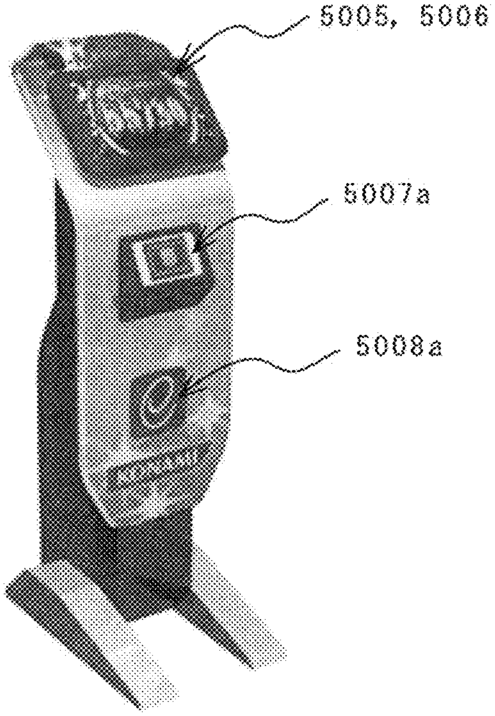
FIG. 13 is an outline view showing a gaming arcade terminal unit.

FIG. 13 is an outline view showing the gaming arcade terminal unit 5000 which controls a system inside a gaming arcade including the progress and control of an intra-arcade jackpot drawing and also makes data communication between the management server 4000 and each of the token-operated game machines in the gaming arcade concerned.

Figure 14:
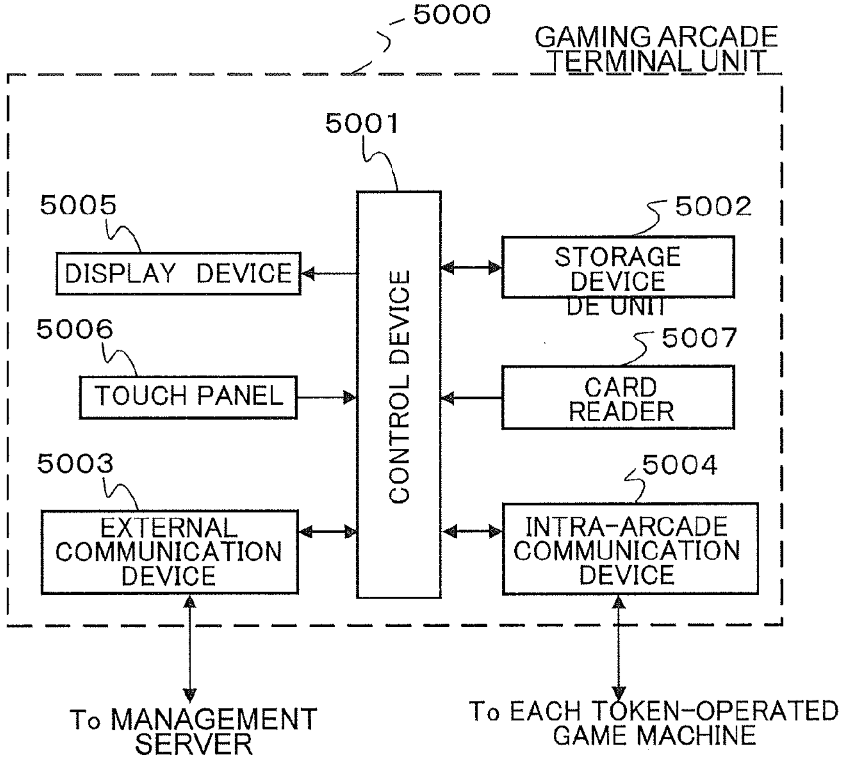
FIG. 14 is a control block diagram of a gaming arcade terminal unit.

FIG. 14 is a control block diagram of the gaming arcade terminal unit 5000.

The gaming arcade terminal unit 5000 is substantially configured with a control device 5001, a storage device 5002 which is a pool amount storage unit functioning as pool amount storage means, an external communication device 5003, an intra-arcade communication device 5004, a display device 5005, a touch panel 5006 which is an operation receiving unit functioning as operation receiving means, a card reader 5007, and a token payout device 5008. The storage device 5002 stores various control programs. The storage device 5002 also stores for each of the token-operated game machines 1000, 2000, 3000 model-specific pool count data (pool amount data) which is the number of tokens obtained by multiplying a pool ratio set for each of the token-operated game machines by the number of tokens (a token received amount) received from a player by each of the token-operated game machines 1000, 2000, 3000 inside the gaming arcade concerned configuring the present game system. Further, the storage device 5002 stores total accumulated token count data sent from the management server 4000 and pool ratio data of each of the token-operated game machines 1000, 2000, 3000. Still further, the storage device 5002 stores for each of the token-operated game machines pool ratio data indicating pool ratios of all of the token-operated game machines 1000, 2000, 3000 connected to the present gaming arcade terminal unit 5000. The external communication device 5003 is a device for making data communication with external devices such as the management server 4000 via WAN. The intra-arcade communication device 5004 is a device for making data communication with each of the token-operated game machines 1000, 2000, 3000 and others via LAN. The display device 5005 is a device for displaying information on various types of operation screens and others. The touch panel 5006 is a device for receiving the operation by a user, a gaming arcade manager and others. The card reader 5007 is a device for reading out a card ID from a user card owned by the user. The token payout device 5008 is a device for paying out tokens from a token payout opening 5008*a*.

Figure 15:
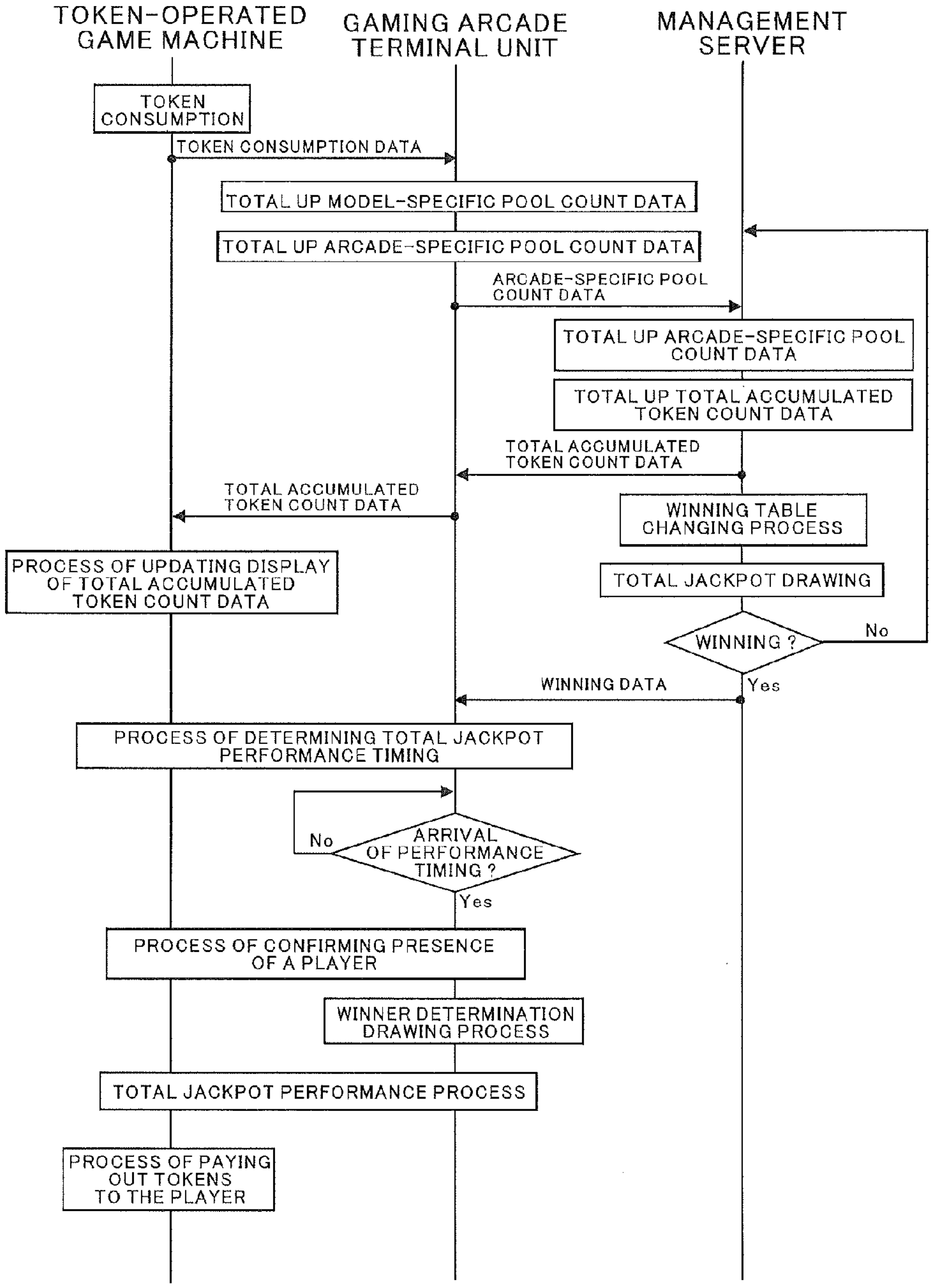
FIG. 15 is a sequence flowchart showing a flow of a total jackpot drawing.

FIG. 15 is a sequence flowchart showing a flow of a total jackpot drawing in the present embodiment. It is noted that FIG. 15 shows one of the token-operated game machines and one of the gaming arcade terminal units respectively for the sake of explanation.

In the present game system, when a player consumes tokens in each of the token-operated game machines 1000, 2000, 3000, data indicating a part of the thus consumed tokens is sent to the gaming arcade terminal unit 5000 of the gaming arcade concerned. The control device 5001 of the gaming arcade terminal unit 5000 stores accumulatively in the storage device 5002 for each of the token-operated game machines 1000, 2000, 3000 inside the gaming arcade connected to the gaming arcade terminal unit 5000 as model-specific pool count data the number of tokens obtained by multiplying a pool ratio indicated by the pool ratio data corresponding to the token-operated game machine by the number of tokens consumed by a player in the token-operated game machine on the basis of the data sent from each of the token-operated game machines. For example, in a token-operated game machine, the pool ratio of which is set to be 1%, a model-specific pool count indicated by the model-specific pool count data is increased by 0.01 when the player consumes one token. Similarly, in a token-operated game machine, the pool ratio of which is set to be 2%, a model-specific pool count indicated by the model-specific pool count data is increased by 0.02 when the player consumes one token. The model-specific pool count data stored in the storage device 5002 is accumulatively stored during a period from the time of winning a previous jackpot award to the present time.

The control device 5001 of the gaming arcade terminal unit 5000 also stores accumulatively at the storage device 5002 gaming arcade-specific pool count data indicating a gaming arcade-specific pool count corresponding to a sum of model-specific pool counts in accordance with the individual token-operated game machines 1000, 2000, 3000 inside a gaming arcade connected to the gaming arcade terminal unit 5000 on the basis of the data sent from each of the token-operated game machines. The gaming arcade-specific pool count data stored in the storage device 5002 is accumulatively stored during a period from the time of winning a previous jackpot award to the present time. Then, the control device 5001 transmits the gaming arcade-specific pool count data inside the storage device 5002 to the management server 4000 at a predetermined timing. It is noted that the gaming arcade-specific pool count data transmitted here is a part which has been accumulatively stored during a period from the time of previous transmission to the time of the present transmission.

When the gaming arcade-specific pool count data is received from each gaming arcade terminal unit 5000, the management server 4000 adds accumulatively a part of the number of tokens indicated by the data to the gaming arcade-specific pool count data corresponding to the gaming arcade concerned inside the storage device 4002. Thereby, a pool count (gaming arcade-specific pool count) is tabulated for each gaming arcade.

Further, when the gaming arcade-specific pool count data is received from each gaming arcade terminal unit 5000, the management server 4000 adds accumulatively a part of the number of tokens indicated by the data to the total accumulated token count data inside the storage device 4002. Thereby, a sum of pool amounts of individual token-operated game machines obtained by multiplying a pool ratio of each token-operated game machine by the number of tokens consumed in all of the token-operated game machines configuring the present game system is tabulated as total accumulated token count data. In the present embodiment, an initial value of the total accumulated token count data is set to be 1000, for example, and a part of the number of tokens consumed by a player is added accumulatively to the initial value. The initial value shall not be fixed but may be changed whenever necessary.

In the present embodiment, also in the above-described pusher game machine 2000, the single-unit jackpot drawing is carried out, and the accumulated token count data of the single-unit jackpot drawing is obtained by calculation only from the number of pieces of tokens consumed in that pusher game machine 2000. On the other hand, the total accumulated token count data of the total jackpot drawing managed and run by the management server 4000 is obtained by calculation from the number of pieces of tokens consumed by all the token-operated game machines constituting the present game system, which are installed in two or more gaming arcades. As a result, it is possible to increase the number of pieces of tokens to be paid out to a winner when the winner wins the jackpot drawing.

An explanation will be given for a flow of specific processing. The control device 4001 of the management server 4000 receives the gaming arcade-specific pool count data transmitted from each gaming arcade terminal unit 5000 at a predetermined timing (for example, every 10 minutes). Thereby, as described above, the gaming arcade-specific pool count data and the total accumulated token count data are tabulated with regard to the gaming arcade concerned. Thereafter, the total accumulated token count data stored in the storage device 4002 at this point in time is transmitted to the gaming arcade terminal unit 5000 which has originally transmitted the previously received gaming arcade-specific pool count data. The gaming arcade terminal unit 5000 which has received the total accumulated token count data transmits the data to each of the token-operated game machines 1000, 2000, 3000. Then, at these token-operated game machines 1000, 2000, 3000 which have received the data, the respective displays of total accumulated token counts are updated on the basis of the received total accumulated token count data. In the present embodiment, a case where the total accumulated token count is individually displayed at each token-operated game machine is shown. Such a configuration is also acceptable that a display device for displaying the total accumulated token count is provided inside a gaming arcade and the total accumulated token count is not individually displayed in each token-operated game machine.

A start condition of a total jackpot drawing in the present embodiment is that in which the management server 4000 receives the gaming arcade-specific pool count data from the gaming arcade terminal unit 5000.

In the present embodiment, upon receipt of the gaming arcade-specific pool count data from each gaming arcade terminal unit 5000, the control device 4001 of the management server 4000 executes a total jackpot drawing program and performs a total jackpot drawing (a group drawing) to determine whether an award is won or a game is lost in the gaming arcade which has originally transmitted the data by checking the generated random number in reference to a predetermined winning table. Here, in the present embodiment, the control device 4001 which has received the gaming arcade-specific pool count data from each gaming arcade terminal unit 5000 performs, prior to the total jackpot drawing, a process for changing a winning table to be used in the total jackpot drawing. Concretely, the control device 4001 performs a process for changing the winning table so that a gaming arcade greater in gaming arcade-specific pool count is made higher in winning probability by referring to the gaming arcade-specific pool count data stored in the storage device 4002. Thereby, a gaming arcade greater in gaming arcade-specific pool count is made higher in probability at which winning is determined in the total jackpot drawing. Then, where winning is determined in the total jackpot drawing, the control device 4001 transmits winning data to the effect of winning in the total jackpot drawing to the gaming arcade terminal unit 5000 which has transmitted the gaming arcade-specific pool count data as a start condition of the drawing.

Another method therefor may include the following, for example. That is, when receiving the arcade-specific pool count data from any one of the gaming arcade terminal units 5000, the control device 4001 of the management server 4000 executes the total jackpot drawing program so as to perform the total jackpot drawing to determine which one of the gaming arcades win or neither one of the gaming arcades win by checking the generated random number in reference to the predetermined winning table. In this total jackpot drawing, the winning gaming arcade may not necessarily be determined Therefore, there is a case where neither one of the gaming arcades wins in the total jackpot drawing. When winning of any one of the gaming arcades is determined in the total jackpot drawing, the control device 4001 transmits the winning data to the effect that the gaming arcade terminal unit 5000 is won in the total jackpot drawing, to the gaming arcade server 5000 (of the gaming arcade) relating to that winning. In this method as well, it is preferable that, prior to the total jackpot drawing, a process for changing a winning table to be used in the total jackpot drawing is performed.

It is noted that the condition for starting the total jackpot drawing is not limited to the above-described condition but may include any condition as long as it may occur at suitable time intervals. For example, the total jackpot drawing may be optionally started under the condition that a predetermined constant time is elapsed.

The gaming arcade terminal unit 5000 that has received the winning data performs a process for determining, as a winner for the total jackpot award, which one of the players who plays in the token-operated game machines 1000, 2000, and 3000 connected to the gaming arcade terminal unit 5000 in the gaming arcade. In this process, it is informed that there is a winner for the total jackpot drawing within the gaming arcade. In this way, a sense of expectation (such as any player can be a winner) is grown and an interest in who has won the game is developed. In doing so, a total performance (hereinafter, referred to as a "total jackpot performance") is carried out for getting attention of, for example, the player and the audience in the whole gaming arcade. This total jackpot performance needs to be carried out simultaneously at all the token-operated game machines 1000, 2000, and 3000 in the gaming arcade, and in this case, due to a certain reason related to the game progress at each of the token-operated game machines 1000, 2000, and 3000, a timing at which the performance is carried out (total jackpot performance timing) needs to be adjusted. Because at each of the token-operated game machines 1000, 2000, and 3000, the game is individually progressed, and thus, depending on a certain progress situation, the progress of that game may be impeded by the total jackpot performance, resulting in an undesirable case where a sense of enjoyment of the player is greatly decreased.

For example, in the horse-racing game machine 1000, if the total jackpot performance is suddenly started at a time when a race is reproduced by using the field unit 1002, the excitement of the game originally provided in that horse-racing game machine is significantly decreased, hence not preferable. Further, in the pusher game machine 2000, if the total jackpot performance is suddenly started in the middle of a drawing where a large amount of tokens to be paid out can be expected such as in a physical drawing of the bingo game and the single-unit jackpot drawing, the excitement of the game originally provided in that pusher game machine is significantly decreased, hence not preferable. Moreover, in the slot machine 3000, if the total jackpot performance is suddenly started in the middle of the winning performance when a large amount of tokens to be paid out such as in the green 7 award and the red 7 award is determined, the joy of the player is significantly decreased, hence, not preferable.

On the other hand, at each of the token-operated game machines 1000, 2000, and 3000, there is a timing at which adverse effect (such as decreasing the enjoyment originally provided in that token-operated game machine) is less caused even when the individual game progress is impeded by the total jackpot performance. For example, in the horse-racing game machine 1000, at a timing used for betting a token by the player, i.e., a timing used for purchasing a betting ticket, the adverse effect is less caused. Thus, this timing is suitable for starting the total jackpot performance. Further, for example, in the pusher game machine 2000, at a timing except for a middle of a drawing where a large amount of tokens to be paid out can be expected or a middle of the winning performance therefor, the adverse effect is less caused. Thus, this timing is suitable for starting the total jackpot performance. Moreover, for example, in the slot machine 3000, at a timing from a first slot game is ended to a subsequent slot game is started, concretely, from a time after the loss is determined in the last slot game or after the winning performance is ended to a time before the start button 3006 of the subsequent slot game is operated, the adverse effect is caused less. Thus, this timing is suitable for starting the total jackpot performance.

In each of the token-operated game machines 1000, 2000, and 3000 of the present embodiment, the game progress situations illustrated here are set in advance as situations where the total jackpot performance can be carried out.

Figure 16:
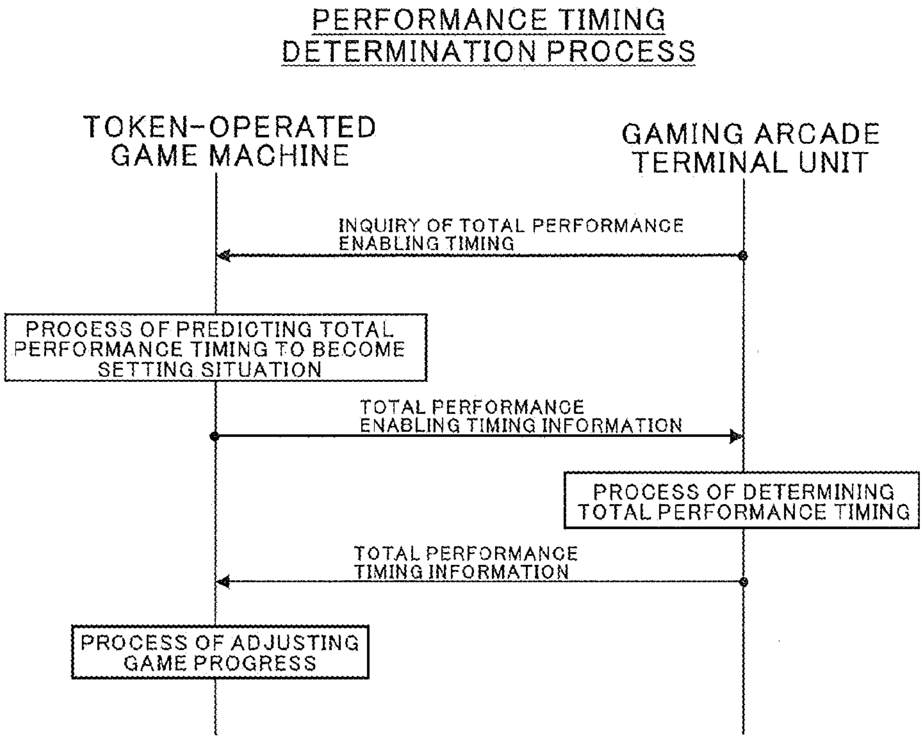
FIG. 16 is a sequence flowchart for explaining a determining process of a total jackpot performance timing.

FIG. 16 is a sequence flowchart for explaining a determining process of the total jackpot performance timing.

The gaming arcade terminal unit 5000 that has received the winning data, first, inquires all the token-operated game machines 1000, 2000, and 3000 through the LAN of a timing at which the game progress situation becomes capable of carrying out the total jackpot performance. In response to this inquiry, the control devices 1101, 2621, and 3101 of the respective token-operated game machines 1000, 2000, and 3000, by working solely or working together with the other control devices 1201, 2601, and 2611, perform a process for predicting a timing at which each game progress situation becomes the above-described setting situation previously determined. Then, the control devices 1101, 2621, and 3101 of the respective token-operated game machines 1000, 2000, and 3000 send total performance enabling timing information indicating the anticipated timing, back to the gaming arcade terminal unit 5000 from the external communication devices 1108, 2625, and 3107. The control device 5001 that is a total performance timing determining unit of the gaming arcade terminal unit 5000, based on the total performance enabling timing information forwarded from each of the token-operated game machines 1000, 2000, and 3000, determines the total performance timing at which the total jackpot performance is carried out. Concretely, based on each total performance enabling timing information, an earliest timing at which the total performance enabling timings of all the token-operated game machines 1000, 2000, and 3000 overlap is specified, and the resultant timing is determined as a total performance timing. Then, information on the determined total performance timing is transmitted to each of the token-operated game machines 1000, 2000, and 3000. In each token-operated game machine that has received the information, at the determined total performance timing, the game progress is controlled so that the game progress situation at each token-operated game machine becomes the above-described predetermined setting situation where the total jackpot performance can be carried out. A specific method of controlling is as follows: the above-described setting situation is stored in each of the token-operated game machines 1000, 2000, and 3000, the stored information on the setting situation is read out to perform the game progress control, or the above-described setting situation is previously installed in a program for game progress control, and the game progress control is carried out according to a content of that program.

It is noted that, in order for the game progress situation to become the above-described setting situation at the exact timing of the total performance timing determined by the control device 5001 of the gaming arcade terminal unit 5000, it may need to perform a fine adjustment for the game progress in the individual token-operated game machines 1000, 2000, and 3000.

As examples of a method for the fine adjustment in the horse-racing game machine 1000, a reproducing time of a race reproduction movie is shortened or lengthened in a reproducing process of a race reproduction movie executed after each race is ended. Concretely, the reproducing time may be shortened or lengthened by setting a time for starting the reproduction of the race reproduction movie in a middle stage of the race or a final stage thereof.

Further, another method for the fine adjustment in the pusher game machine 2000 is as follows: in the slot game executed at each station unit ST, the fine adjustment is carried out by display control to lengthen or shorten a time from which the rotation of the three dice-shaped slots DS is started until it is stopped. Concretely, a speed for reproducing video from the start of the rotation of the three dice-shaped slots DS to the stop thereof may be lengthened or shortened, for example. In this case, there is no need of editing the video itself, thus, the display process is easy.

Moreover, the method for the fine adjustment in the slot machine 3000 is as follows: the fine adjustment is carried out by drive control in which a time from a start of the rotation of the three reels to a stop thereof is lengthened or shortened.

The method for the fine adjustment is not limited to those described above, and it is determined, where appropriate, depending on a game content, etc., of each of the token-operated game machines 1000, 2000, and 3000.

In particular, in a game machine in which a digital drawing is carried out, a method for lengthening or shortening a time period during which a video for drawing performance is displayed is effective as in the case of the above-described pusher game machine 2000.

It is noted that the method for determining the total performance timing is not limited to those described above.

For example, rather than inquiring each of the token-operated game machines 1000, 2000, and 3000 of the total performance enabling timing, the total performance timing is determined according to a predetermined total performance timing determining condition. Then, the determined total performance timing is transmitted to each of the token-operated game machines 1000, 2000, and 3000, and the game progress control is carried out in each token-operated game machine so that the game progress situation at each token-operated game machine becomes the above-described predetermined setting situation in which the total jackpot performance can be carried out at the determined total performance timing. This method is effective particularly when the token-operated game machine constituting the present game system is high in the degree of freedom of the control of the game progress situation.

When the total performance timing determined by the gaming arcade terminal unit 5000 arrives, as shown in FIG. 15, the control device 5001 of the gaming arcade terminal unit 5000 performs a player presence confirming process for identifying the player who plays by using each of the token-operated game machines 1000, 2000, and 3000. Concretely, inquiries are made to all the token-operated game machines 1000, 2000, and 3000 through the LAN confirming the presence of a player at each game machine. In each of the token-operated game machines 1000, 2000, and 3000 that have received an inquiry, the player presence confirming process is carried out. Concretely, if the card ID is read by using the card reader in each of the token-operated game machines 1000, 2000, and 3000, it is determined that the player is present. It is noted that the method for confirming whether the player is present is not limited to those described above, and may adopt any other method.

Each of the token-operated game machines 1000, 2000, and 3000 performs the player presence confirming process, and then, sends back presence confirming information that is the process result of that confirming process to the gaming arcade terminal unit 5000 from the external communication devices 1108, 2625, and 3107. The control device 5001 of the gaming arcade terminal unit 5000 recognizes the station or the station unit or the slot machine played by the player (hereinafter, referred to as a "station and others") which are specified based on the presence confirming information forwarded from each of the token-operated game machines 1000, 2000, and 3000. Then, the control device 5001 executes a winner determination drawing program so as to perform a winner determination drawing process for determining which drawing target is won while respectively regarding the recognized station and others as the drawing targets. Concretely, a winning table on which each drawing target is assigned an equal winning probability is generated, and a drawing target corresponding to a random number generated based on the winning table is chosen, thereby determining the winning of the chosen drawing target. In the present embodiment, in the winner determination drawing process, in addition to the total jackpot award, prepared are: a big winning with a fixed number of pieces of tokens (big bonus award), a medium winning with a fixed number of pieces of tokens (middle bonus award), and a small winning with a fixed number of pieces of tokens (small bonus award). Therefore, for these awards, the control device 5001 sequentially determines the winning drawing target by using the above-described method.

Here, a winning probability has been made equal in each drawing object but may not be equal. For example, in the gaming arcade terminal unit 5000, a pool amount (a model-specific pool count) for each of the token-operated game machines 1000, 2000, 3000 is stored in the storage device 5002 as the model-specific pool count data. Therefore, it is acceptable that a drawing object corresponding to a token-operated game machine greater in the model-specific pool count is made relatively higher in winning probability, while a drawing object corresponding to a token-operated game machine lower in the model-specific pool count is made relatively lower in winning probability. In this instance, an effect that a total actual payout ratio can be easily brought closer to a total preset payout ratio in each of the token-operated game machines 1000, 2000, 3000 is obtained. Further, on the other hand, it is acceptable that a drawing object corresponding to a token-operated game machine greater in the model-specific pool count is made relatively lower in winning probability, while a drawing object corresponding to a token-operated game machine lower in the model-specific pool count is made relatively higher in winning probability. In this instance, since a jackpot award can be more easily won in a token-operated game machine lower in popularity, the game apparatus lower in popularity is able to regain popularity.

The winner determination drawing process is ended in this way, and the station and others that have won each award are determined. Then, the control device 5001 of the gaming arcade terminal unit 5000 informs each of the token-operated game machines 1000, 2000, and 3000 of the winning result, and at the same time, transmits the total performance control command to each of the token-operated game machines 1000, 2000, and 3000. Thereby, the total jackpot performance that utilizes the performance unit of each of the token-operated game machines 1000, 2000, and 3000 connected to the gaming arcade server 5000 is carried out.

Figure 17:
FIG. 17 is an explanatory view showing an example of a jackpot start screen displayed on a display unit at each of the stations, etc., which are drawing targets.

In each of the token-operated game machines 1000, 2000, and 3000 that has received the total performance control command from the gaming arcade terminal unit 5000, jackpot start screens to the effect that a total jackpot drawing is started as shown in FIG. 17 are simultaneously displayed on the display 1011, the display unit 2700, and the performance panel 3011 that are respectively display units functioning as display means of the station and others relating to the drawing target. At the station and others that are not the drawing targets, i.e., the station and others at which it is decided that a player is not playing the game, this jackpot start screen is not displayed.

In the present embodiment, at the station and others that are not drawing targets, a player is capable of playing a game of the token-operated game machine even during the total jackpot performance. Thus, there is a probability that during the total jackpot performance, an individual performance according to the game progress at the station and others that are not the drawing target is carried out. However, it is probable that if an individual performance not related to the total jackpot performance is carried out during the total jackpot performance, the total jackpot performance is impeded by the individual performance, thereby decreasing a good characteristic of the total jackpot performance. Therefore, in the present embodiment, the station and others that are not the drawing targets are controlled so that the individual performance according to the game progress is not carried out or a subtle performance only is carried out by decreasing a sound volume, a light amount, etc., so that the individual performance does not stand out during the total jackpot performance.

As a result of working solely or working together with the other control devices 1201, 2601, and 2611, the control devices 1101, 2621, and 3101 of the respective token-operated game machines 1000, 2000, and 3000 carries out the total jackpot performance process by executing the total performance program. In particular, when the performance units such as the speaker and the illuminating device of each of the token-operated game machines 1000, 2000, and 3000 are caused to carry out a performance assuming part of the total jackpot performance, it becomes possible to carry out a single total performance (total jackpot performance) in which all the token-operated game machines 1000, 2000, and 3000 connected to the gaming arcade server 5000 are cooperated with each other. Concretely, for example, in all the token-operated game machines 1000, 2000, and 3000, illumination in blue and red are alternately emitted at the same timing, the same music or sound effect to the effect that the total jackpot drawing is started at the same timing, and other similar effects are provided.

It is noted that, in the present embodiment, the performance unit of each of the token-operated game machines 1000, 2000, and 3000 is configured by hardware different from each another, and thus, it is not possible to carry out the completely same performance. To solve this, it may be possible to carry out the total jackpot performance that gives a sense of unity as a whole by deliberately combining the performances different from each other at each of the token-operated game machines 1000, 2000, and 3000. As an example of music and sound effect, the horse-racing game machine 1000 may take a low-sound part, the pusher game machine 2000 may take a middle-sound part, and the slot machine 3000 may take a high-sound part.

There are specific, various performance methods for the total jackpot performance that can carry out a performance that gives a sense of unity as a whole, which is achieved as a result of a mutual synchronization of the performances provided by the performance units of each of the token-operated game machines 1000, 2000, and 3000.

Figure 18:
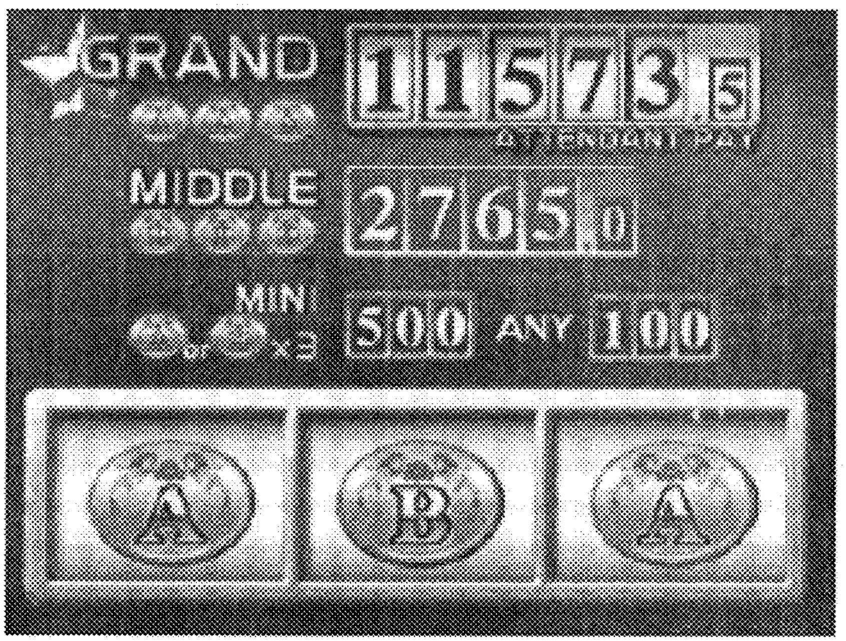
FIG. 18 is an explanatory view showing an example of a slot screen displayed on a display unit at each of the stations, etc., which are drawing targets.

After the total jackpot performance is started in this way, on each of the display units 1011, 2700, and 3011, a slot screen as shown in FIG. 18 is displayed subsequent to the jackpot start screen as shown in FIG. 17. Then, after the three reel images on the slot screen start a varying display, stop/display control is carried out on the three reel images on each of the display units 1011, 2700, and 3011 so that symbols that reflect winning or losing at the respective corresponding station and others are stopped and displayed. Concretely, in the present embodiment, as described above, there are the four awards, i.e., the total jackpot award, the big bonus award that is a payout award, the middle bonus award that is a payout award, and the small bonus award that is a payout award, and the stop/display control is carried out so that a combination of symbols corresponding to the respective awards is stopped and displayed on the slot screen. More particularly, on the display units 1011, 2700, and 3011 of the station and others that have won the total jackpot award, the stop/display control is carried out so that three identical A symbols are stopped and displayed. On the display units 1011, 2700, and 3011 of the station and others that have won the big bonus award, the stop/display control is carried out so that three identical B symbols are stopped and displayed. On the display units 1011, 2700, and 3011 of the station and others that have won the middle bonus award, the stop/display control is carried out so that a combination of symbols mixed with the A symbols and B symbols is stopped and displayed. On the display units 1011, 2700, and 3011 of the station and others that have won the small bonus award, the stop/display control is carried out so that a combination of symbols is stopped and displayed. In this case, the combination is: the A symbol or the B symbol is stopped and displayed on both a left reel image and a middle reel image, and neither the A symbol nor the B symbol is stopped and displayed on a right reel image (i.e., a blank symbol is stopped and displayed).

It is noted that there is no need that the jackpot start screen and the slot screen are completely the same in all the token-operated game machines 1000, 2000, and 3000. For example, these screens may be appropriately modified according to hardware with which these screens are displayed, or may be arranged according to the game content of each of the token-operated game machines 1000, 2000, and 3000.

Moreover, in the present embodiment, the varying display of the reel images on the slot screen is simultaneously started in all the token-operated game machines 1000, 2000, and 3000 connected to the gaming arcade terminal unit 5000; however, a completion timing at which the three reel images are stopped and displayed is differed depending on each award. Concretely, with respect to a time it takes for the stop display completion timing, it takes the least time for the station and others corresponding to the loss; it gradually takes more time in the order of the small bonus award, the middle bonus award, the big bonus award, and the total jackpot award.

Further, in the present embodiment, also while the varying display of the reel images on the slot screen is started and the stop display is completed, the drawing performance (total jackpot performance) is carried on. For example, after the varying display of the reel image is started on the slot screen, the performance is carried out so that the station and others illuminated with a light are sequentially switched. In this case, the illumination of the corresponding station and others (that are drawing targets of each of the token-operated game machines 1000, 2000, and 3000) are lit only in periods different from each other. Then, the drawing performance is carried out so that at the timing at which the stop display of the reel images at the station and others is completed, the illumination of the station and others is flashed.

After the drawing performance is ended in this way, a process for paying out tokens of which the number of pieces corresponds to that of each award is carried out for the player who plays at the station and others that have won each award. This token payout may be carried out by utilizing the token payout unit of the token-operated game machines 1000, 2000, and 3000, or may be carried out by way of an attendant pay in which the payout is made by an employee at the gaming arcade.

The following description will explain features of the present invention.

In the present embodiment, pool ratio data indicating pool ratios of all of the token-operated game machines 1000, 2000, 3000 can be changed independent from each other. Concretely, a gaming arcade manager first performs a predetermined call operation in the gaming arcade terminal unit 5000, by which the control device 5001 performs a process for allowing the display device 5005 to display a pool-ratio setting changing screen. It is preferable to take, for example, a countermeasure to lock an operating unit for performing the call operation so that no one other than the gaming arcade manager can perform the call operation.

The pool-ratio setting changing screen displayed on the display device 5005 displays a button image for selecting a token-operated game machine, the pool ratio of which is to be changed out of token-operated game machines connected to the gaming arcade terminal unit 5000. When a gaming arcade manager or someone touches the button image for selecting the token-operated game machine, the pool ratio of which is to be changed, the operation signal thereof is transmitted to the control device 5001 from the touch panel 5006 which is a changing operation receiving unit functioning as changing operation receiving means. Thereby, the control device 5001 performs a process for allowing the display device 5005 to display a pool ratio input screen. The pool ratio input screen displays various button images necessary for inputting a post-change pool ratio of the selected token-operated game machine. When the gaming arcade manager or someone operates to input the pool ratio on the pool ratio input screen, the operation signal thereof is transmitted from the touch panel 5006 to the control device 5001. The control device 5001 which has received the signal performs a process for changing the pool ratio data corresponding to the thus selected token-operated game machine among pool ratio data of individual token-operated game machines stored in the storage device 5002 to the data indicating the pool ratio related to the operation signal. In this instance, the pool ratio data related to other token-operated game machines is not changed.

After receipt of token consumption data transmitted from the token-operated game machine related to the change, the control device 5001 which has changed the pool ratio data as described above tabulates model-specific pool count data and gaming arcade-specific pool count data on the basis of the post-change pool ratio data.

Further, the control device 5001 which has changed the pool ratio data performs a process for transmitting the post-change pool ratio data in the token-operated game machine related to the change. The control device, that is, a pool ratio changing unit of the token-operated game machine which has received the post-change pool ratio data, functions as pool ratio changing means, thereby performing a process for changing an it's own pool ratio data to the received pool ratio data. In each of the token-operated game machines 1000, 2000, 3000, as described above, a ratio (a normal actual payout ratio) of the number of tokens actually paid out to players to the number of tokens consumed by the players in a normal game in the past (a game other than a total jackpot drawing performed in the token-operated game machine concerned) is controlled so as to come closer to a normal preset payout ratio obtained by deducting an it's own pool ratio from an it's own total preset payout ratio. Thus, where a pool ratio is decreased by the received pool ratio data, the normal preset payout ratio is increased. Therefore, a player is able to obtain tokens easily in the normal game. On the other hand, where the pool ratio is increased by the received pool ratio data, the normal preset payout ratio is decreased. Therefore, it becomes difficult for the player to obtain tokens in the normal game.

Further, in the present embodiment, as with the case in which the pool ratio is changed, it is possible to change individually a total preset payout ratio of each of the token-operated game machines 1000, 2000, 3000. Concretely, a gaming arcade manager first performs a predetermined call operation in the gaming arcade terminal unit 5000, by which the control device 5001 performs a process for allowing the display device 5005 to display a preset payout ratio setting change screen. The preset payout ratio setting change screen displays a button image for selecting a token-operated game machine, the total preset payout ratio of which is changed, among token-operated game machines connected to the present gaming arcade terminal unit 5000. When the gaming arcade manager or someone touches the button image for selecting the token-operated game machine, the total preset payout ratio of which is changed, the operation signal thereof is transmitted from the touch panel 5006 to the control device 5001. Thereby, the control device 5001 performs a process for allowing the display device 5005 to display the preset payout ratio input screen. The preset payout ratio input screen displays various button images necessary for inputting a post-change total preset payout ratio in the selected token-operated game machine. The gaming arcade manager or someone operates to input the total preset payout ratio on the preset payout ratio input screen, by which the operation signal is transmitted from the touch panel 5006 to the control device 5001. The control device 5001 which has received the signal performs a process for transmitting post-change preset payout ratio data to the token-operated game machine related to the change. The control device, that is, a preset payout ratio changing unit of the token-operated game machine which has received the post-change preset payout ratio data, functions as preset payout ratio changing means, thereby performing a process for changing the it's own preset payout ratio data to the received preset payout ratio data. Where a total preset payout ratio is decreased by the received preset payout ratio data, a normal preset payout ratio is also decreased. Therefore, it becomes difficult for a player to obtain tokens in a normal game. On the other hand, where the total preset payout ratio is increased by the received preset payout ratio data, the normal preset payout ratio is also increased. Therefore, the player is able to obtain tokens easily in the normal game.

As described above, in the present embodiment, pool ratio data of each of the token-operated game machines 1000, 2000, 3000 which controls the progress of a game different in content from each other can be changed independently with respect to other token-operated game machines. Therefore, in a range which will not substantially influence the game balance of a normal game (a game other than a jackpot drawing) in each of the token-operated game machines 1000, 2000, 3000, it is possible to change individually a pool ratio of each of the token-operated game machines. As a result, in a range that will not substantially influence the game balance of all of the token-operated game machines 1000, 2000, 3000 in the gaming arcade concerned, it is possible to expand an extent of changing a pool amount for increasing or decreasing a gaming arcade-specific pool amount in the overall gaming arcade concerned. Thereby, flexible management can be provided for each gaming arcade. In particular, in the present embodiment, the total preset payout ratio of each token-operated game machine can be changed to provide more flexible management.

Further, in a conventional game system which is configured so as to make all pool ratios equal in individual token-operated game machines, it is difficult to incorporate into a game system such a token-operated game machine that will give a large influence on the game balance of a normal game by a significant change in the pool ratio. However, according to the present embodiment, it is possible to change individually pool ratios of each of the token-operated game machines 1000, 2000, 3000. Thus, even where token-operated game machines are mixed which may give a large influence on the game balance of a normal game by a significant change in the pool ratio, other token-operated game machines can be changed in pool ratio without being limited by the presence of these token-operated game machines. Thereby, these other token-operated game machines are changed in pool ratio significantly, thus making it possible to increase or decrease a gaming arcade-specific pool amount greatly.

Moreover, instead of being applied to the above-described types of machines, the token-operated game machine applicable to the game system of the present embodiment can be applied to a wide use.

It is noted that the token-operated game machine is also applicable to a game system inside the same gaming arcade.

In the above-described embodiment, means realized by software such as a computer program may be optionally realized by hardware such as a circuit board and a chip. Moreover, means realized by hardware such as a circuit board and a chip may be optionally realized by software such as a computer program.

The invention claimed is:

1. A game system in which a plurality of game apparatuses and a drawing machine for jackpot game are connected to each other, so as to permit data communication, wherein a game progress control unit for controlling the progress of a game, which is provided in each of the plurality of game apparatuses controls progress of a game different in content from each other, wherein each of the plurality of game apparatuses comprises:

the game progress control unit, a bet object receiving unit for receiving bet objects, a payout processing unit which performs a payout process for paying out to a player a predetermined amount of payout objects based on a result of the game whose progress is controlled by the game progress control unit on condition that the bet object receiving unit receives the bet objects, a pool ratio storage unit for storing pool ratio data indicating a game apparatus's own pool ratio, and a preset payout ratio storage unit for storing a preset payout ratio data indicating a game apparatus's own total preset payout ratio, wherein the drawing machine for jackpot game comprises:

a drawing unit which performs a jackpot drawing for determining a winning player of a jackpot award among players who play the respective plurality of game apparatuses, a payout amount storage unit for storing payout amount data including an amount of payout objects to be paid out to the winning player when the drawing unit makes determination of winning of the jackpot award, a jackpot payout processing unit which performs a jackpot payout process for reading out the payout amount data from the payout amount storage unit upon the determination of the winning of the jackpot award by the drawing unit and paying out to the winning player at least a part of payout objects corresponding to an amount indicated by the read-out payout amount data, and a payout amount increasing unit for increasing cumulatively an amount indicated by the payout amount data stored in the payout amount storage unit, according to each pool amount obtained by multiplying the pool ratio of each game apparatus by an amount of bet objects received by each bet object receiving unit of the plurality of game apparatuses when a predetermined payout amount increasing condition is satisfied, wherein each game progress control unit of the plurality of game apparatuses controls the progress of the game in such a manner that a ratio of an amount of payout objects paid out to players by the payout process of the payout processing unit to an amount of bet objects received by the bet object receiving unit within a predetermined period is substantially equal to a normal preset payout ratio obtained by deducting a pool ratio indicated by the pool ratio data stored in the pool ratio storage unit of the game apparatus from a total preset payout ratio indicated by the preset payout ratio data stored in the preset payout ratio storage unit of the game apparatus, and wherein each of the plurality of game apparatuses comprises a pool ratio changing unit for changing the pool ratio data stored in the game apparatus's own pool ratio storage unit independently from each other.

2. The game system according to claim 1, wherein at least one game apparatus among the plurality of game apparatuses comprises a preset payout ratio changing unit for changing the preset payout ratio data stored in the game apparatus's own preset payout ratio storage unit.

3. The game system according to claim 2, further comprising a single changing operation receiving unit for receiving a changing operation of pool ratio data in two or more game apparatuses, wherein each pool ratio changing unit of the two or more game apparatuses changes pool ratio data stored in the pool ratio storage unit of the game apparatus to pool ratio data related to the changing operation received by the changing operation receiving unit when the changing operation receiving unit receives the changing operation of pool ratio data in the game apparatus concerned.

4. The game system according to claim 3, wherein the drawing machine for jackpot game comprises; a pool amount storage unit for storing pool amount data indicating pool amounts of the plurality of game apparatuses within a predetermined period for every game apparatus, and a winning probability changing unit for changing a winning probability of the jackpot award in each player who plays the plurality of game apparatuses according to a pool amount indicated by pool amount data corresponding to the game apparatus played by the player concerned.

5. The game system according to claim 2, wherein the drawing machine for jackpot game comprises; a pool amount storage unit for storing pool amount data indicating pool amounts of the plurality of game apparatuses within a predetermined period for every game apparatus, and a winning probability changing unit for changing a winning probability of the jackpot award in each player who plays the plurality of game apparatuses according to a pool amount indicated by pool amount data corresponding to the game apparatus played by the player concerned.

6. The game system according to claim 1, further comprising a single changing operation receiving unit for receiving a changing operation of pool ratio data in two or more game apparatuses, wherein each pool ratio changing unit of the two or more game apparatuses changes pool ratio data stored in the pool ratio storage unit of the game apparatus to pool ratio data related to the changing operation received by the changing operation receiving unit when the changing operation receiving unit receives the changing operation of pool ratio data in the game apparatus concerned.

7. The game system according to claim 6, wherein the drawing machine for jackpot game comprises; a pool amount storage unit for storing pool amount data indicating pool amounts of the plurality of game apparatuses within a predetermined period for every game apparatus, and a winning probability changing unit for changing a winning probability of the jackpot award in each player who plays the plurality of game apparatuses according to a pool amount indicated by pool amount data corresponding to the game apparatus played by the player concerned.

8. The game system according to claim 1, wherein the drawing machine for jackpot game comprises; a pool amount storage unit for storing pool amount data indicating pool amounts of the plurality of game apparatuses within a predetermined period for every game apparatus, and a winning probability changing unit for changing a winning probability of the jackpot award in each player who plays the plurality of game apparatuses according to a pool amount indicated by pool amount data corresponding to the game apparatus played by the player concerned.

9. The game system according to any one of claims 1 to 3, wherein four or more of the game apparatuses are provided, the drawing unit of the drawing machine for jackpot game performs a group drawing for selecting one winning group among a plurality of predetermined groups, each of which includes two or more game apparatuses, according to a predetermined group drawing condition, and where the winning group is selected by the group drawing, a winner drawing is performed for selecting a jackpot award winning player among players who play respective two or more game apparatuses belonging to the winning group, thereby performing the jackpot drawing, and the drawing machine for jackpot game comprises: a pool amount storage unit which stores for every group total pool amount data indicating a total pool amount obtained by summing up pool amounts of two or more game apparatuses belonging to each group within a predetermined period, and a winning probability changing unit for changing a winning probability of the group drawing in each group in such a manner that a group greater in total pool amount indicated by the total pool amount data corresponding to the group concerned is made higher in winning probability.

10. The game system according to claim 9, wherein the game apparatus is a game apparatus for business use installed in a gaming arcade, and the plurality of predetermined groups are divided into groups for each gaming arcade in which each game apparatus is installed.

11. The game system according to claim 10, wherein the drawing machine for jackpot game comprises a gaming arcade server of each gaming arcade connected in a manner to enable communication with two or more game apparatuses installed in the same gaming arcade, and a management server connected in a manner to enable communication with each of the gaming arcade servers, the group drawing is performed by a drawing unit installed in the management server, and the winner drawing is performed by a drawing unit installed in the gaming arcade server of the gaming arcade related to a winning group selected by the group drawing.

* * * * *